(12) United States Patent
Yamashita et al.

(10) Patent No.: US 7,365,911 B2
(45) Date of Patent: Apr. 29, 2008

(54) ZOOM LENS AND IMAGE PICKUP APPARATUS

(75) Inventors: Atsushi Yamashita, Hachioji (JP); Eigo Sano, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 18 days.

(21) Appl. No.: 11/528,003

(22) Filed: Sep. 26, 2006

(65) Prior Publication Data

US 2007/0070513 A1    Mar. 29, 2007

(51) Int. Cl.
*G02B 15/14* (2006.01)
(52) U.S. Cl. .................. 359/676; 359/683; 359/687
(58) Field of Classification Search ............... 359/676, 359/683, 687
See application file for complete search history.

(56) References Cited

U.S. PATENT DOCUMENTS

2005/0195492 A1* 9/2005 Nishina et al. ............. 359/687
2006/0152816 A1* 7/2006 Kuroda et al. ............. 359/684

* cited by examiner

*Primary Examiner*—Scott J. Sugarman
*Assistant Examiner*—Darryl J. Collins
(74) *Attorney, Agent, or Firm*—Cohen Pontani Lieberman & Pavane LLP

(57) ABSTRACT

A zoom lens including a first lens group having a positive refractive power, a second lens group having a negative refractive power, a third lens group having a positive refractive power, a fourth lens group having a positive refractive power and a fifth lens group having a negative refractive power, in an order from an object; wherein a variable power from a wide angle end to a telephoto end is performed by changing distances among the respective lens groups, and the fourth lens group comprises a three cemented lens comprising a positive c1 lens, a negative c2 lens, and a positive c3 lens from an order from the object.

20 Claims, 16 Drawing Sheets

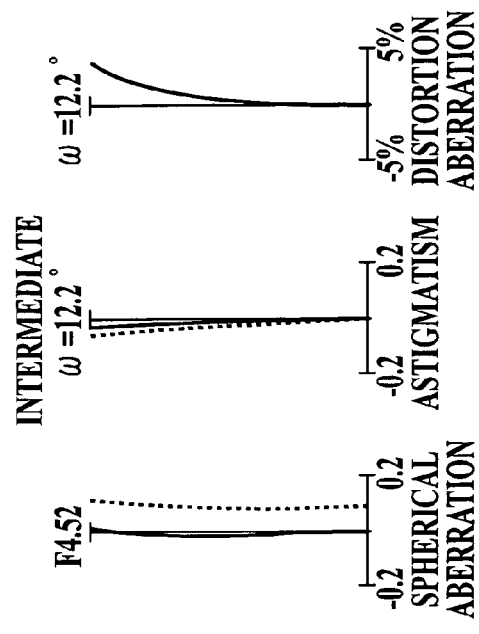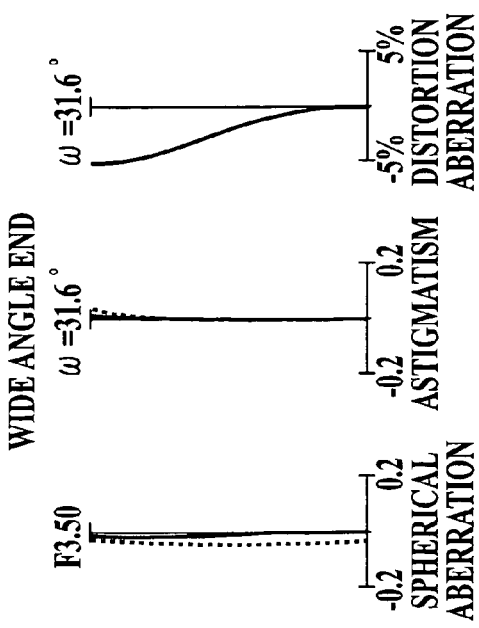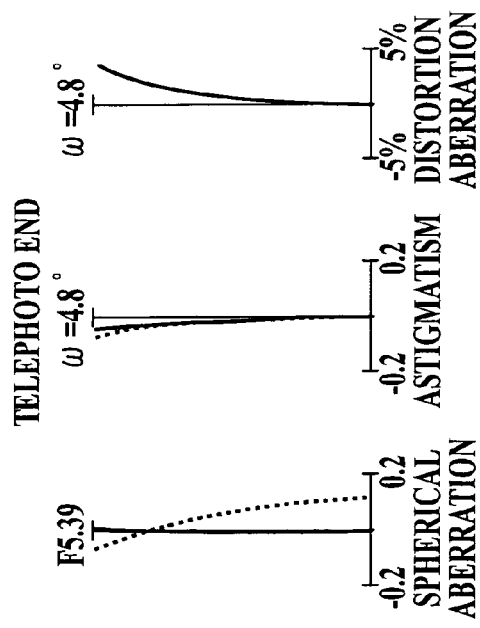
FIG.2B INTERMEDIATE
FIG.2A WIDE ANGLE END
FIG.2C TELEPHOTO END

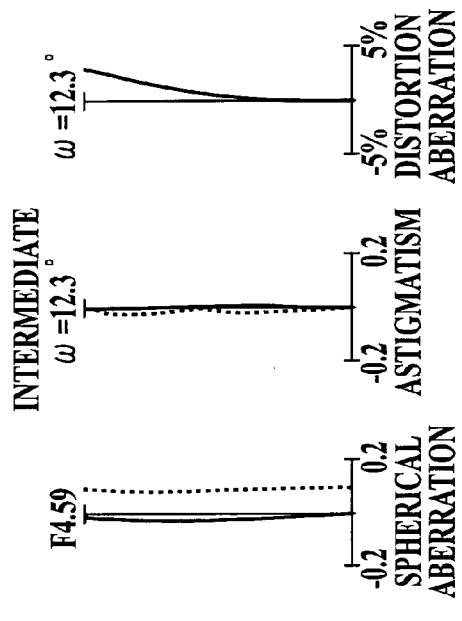
FIG.4B INTERMEDIATE
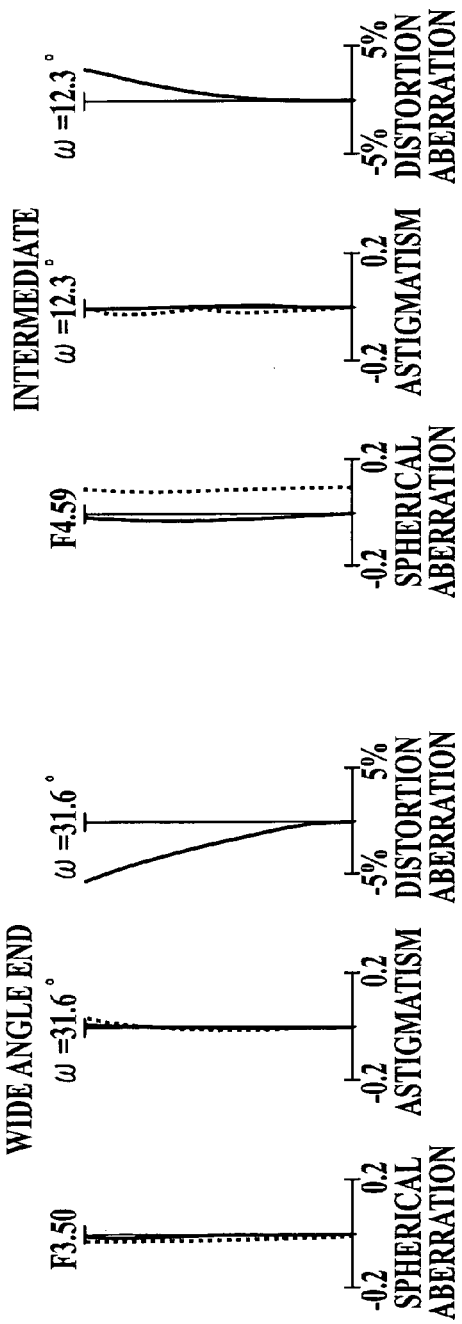
FIG.4A WIDE ANGLE END
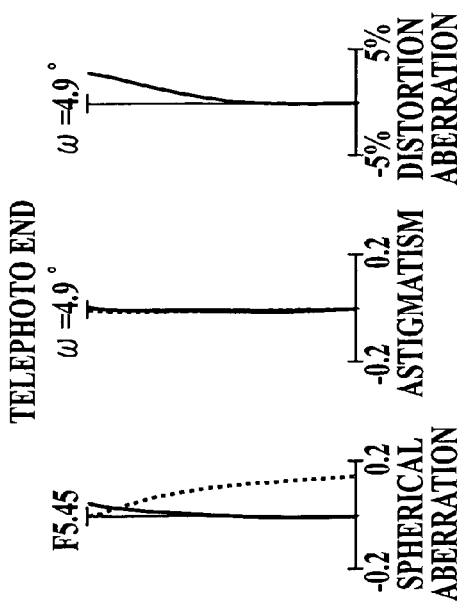
FIG.4C TELEPHOTO END

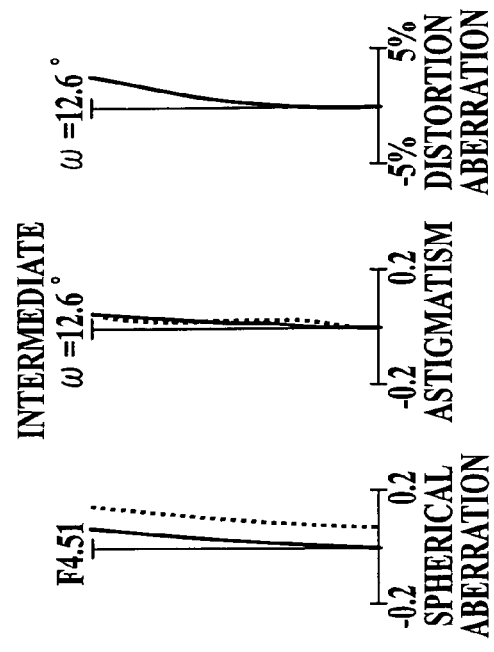
FIG.6B INTERMEDIATE
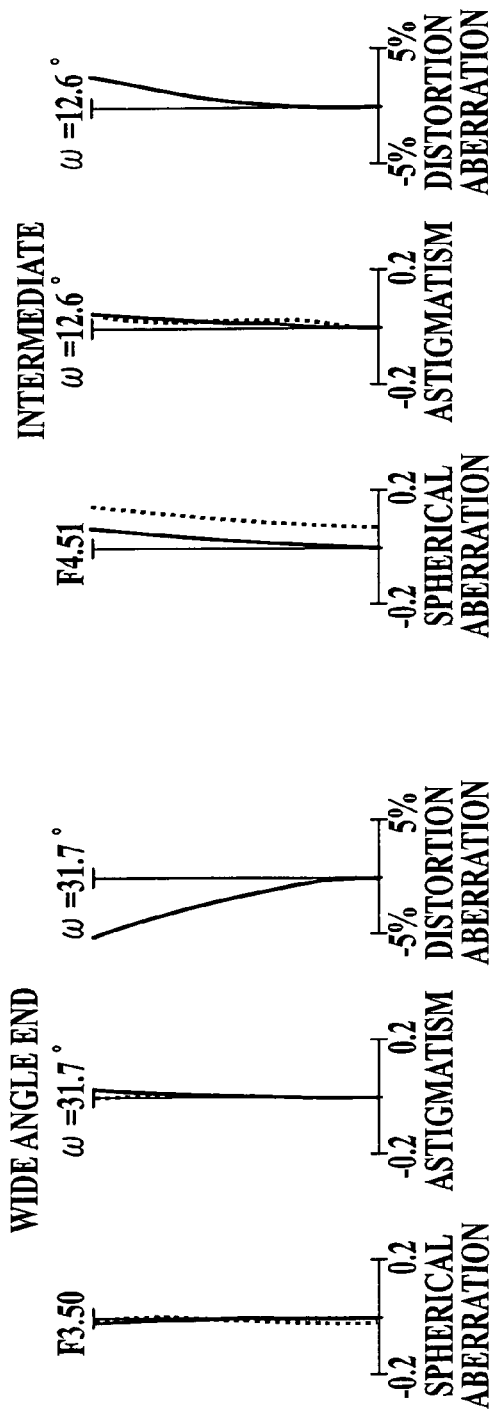
FIG.6A WIDE ANGLE END
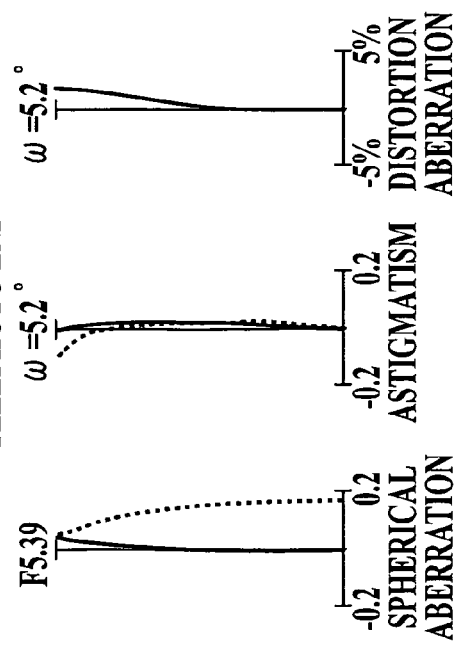
FIG.6C TELEPHOTO END

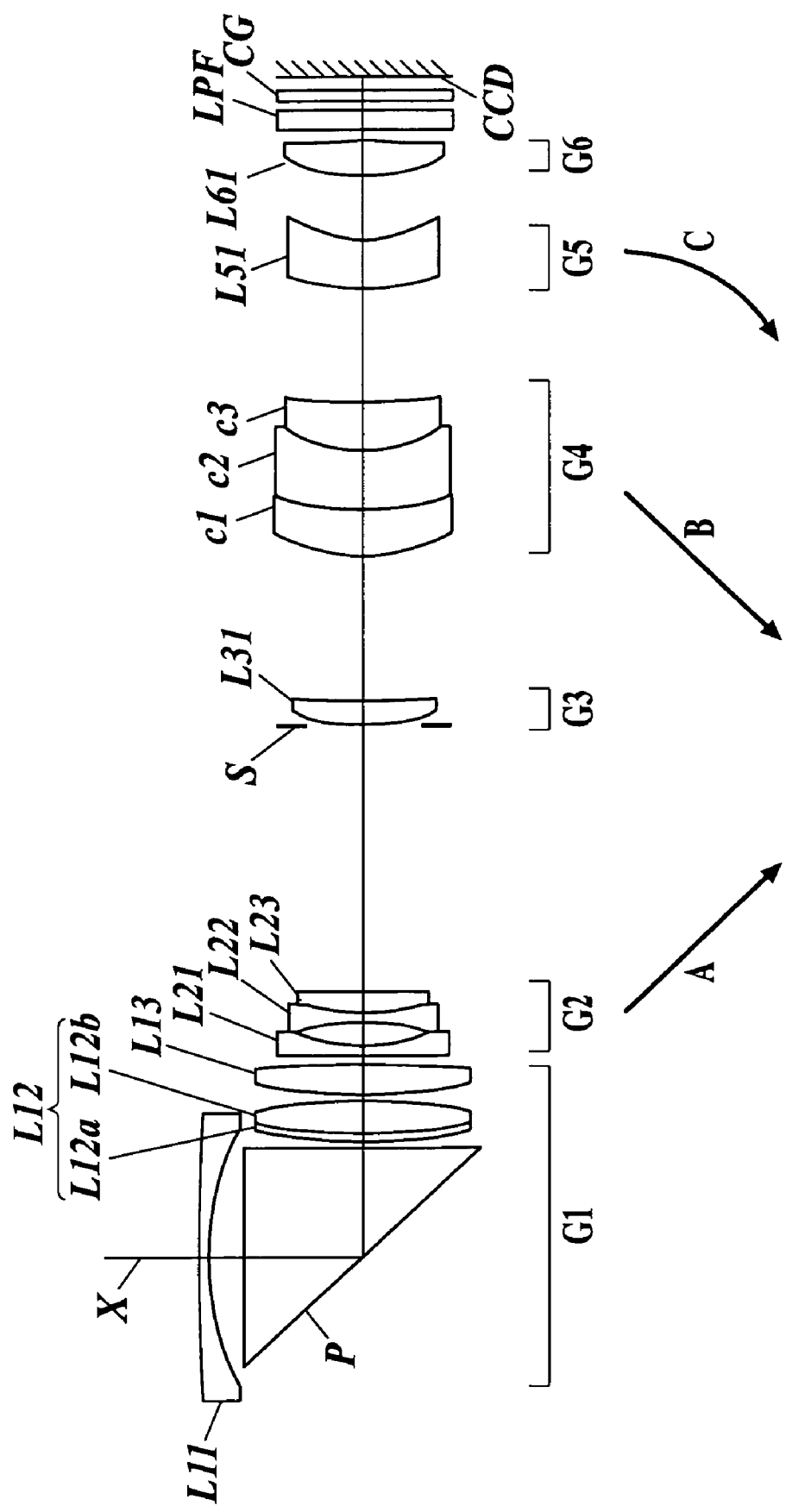

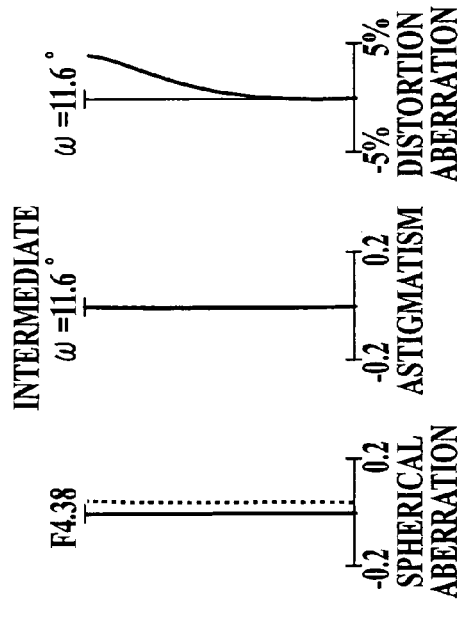
*FIG.8B* INTERMEDIATE
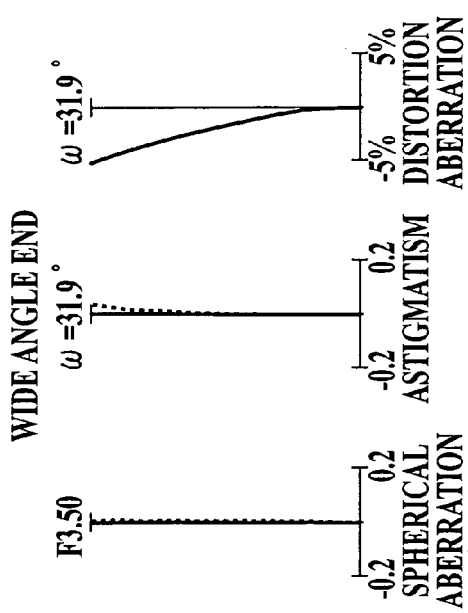
*FIG.8A* WIDE ANGLE END
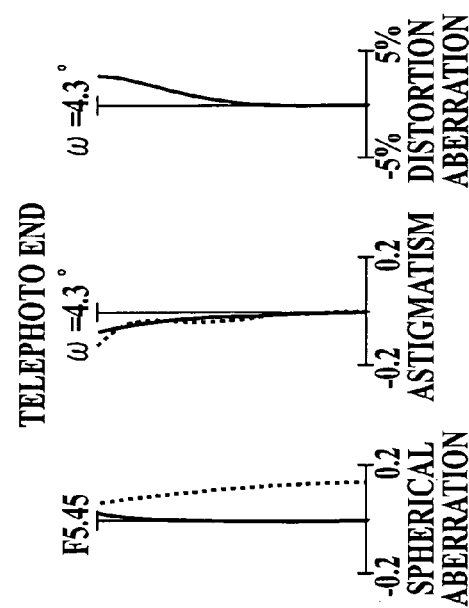
*FIG.8C* TELEPHOTO END

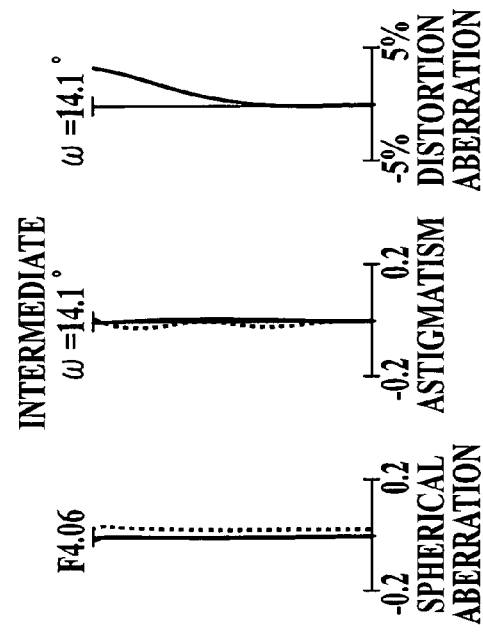
*FIG.10B* INTERMEDIATE
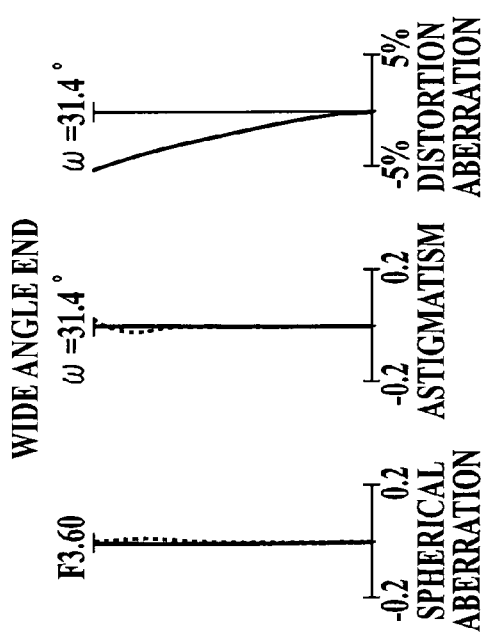
*FIG.10A* WIDE ANGLE END
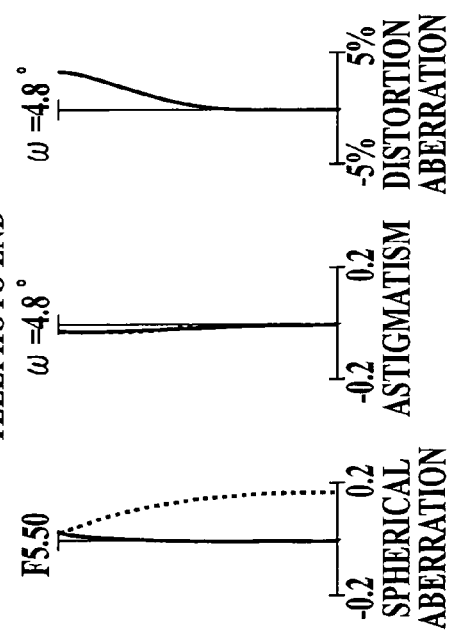
*FIG.10C* TELEPHOTO END

INTERMEDIATE

WIDE ANGLE END

TELEPHOTO END

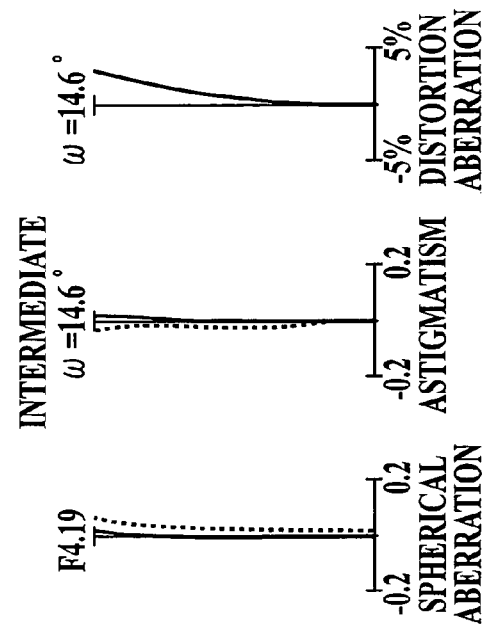
FIG.14B INTERMEDIATE
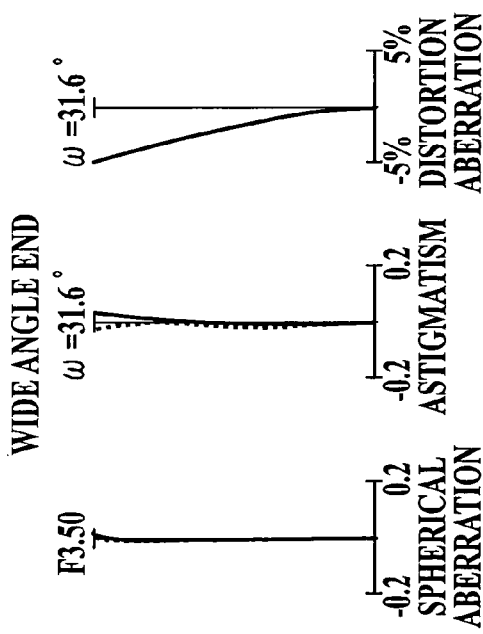
FIG.14A WIDE ANGLE END
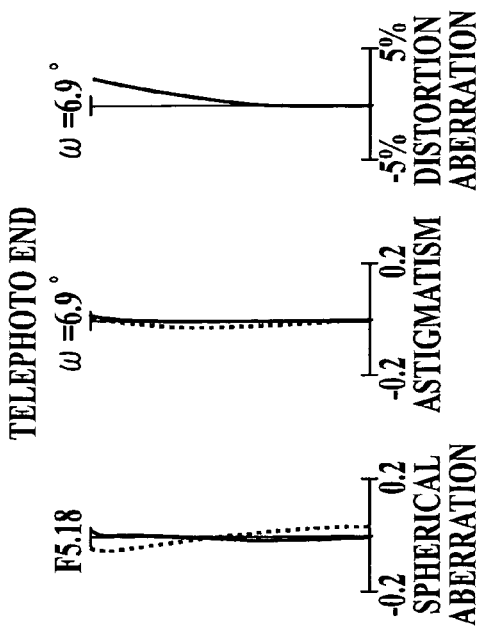
FIG.14C TELEPHOTO END

ZOOM LENS AND IMAGE PICKUP APPARATUS

BACKGROUND OF THE INVENTION

1. Field of the Invention

The present invention relates to a zoom lens and an image pickup apparatus. The present invention relates to a zoom lens and an image pickup apparatus for a charge-coupled device (CCD) or a complementary metal oxide semiconductor (CMOS) that are used for a digital camera or a video camera for example, that have a variable power ratio of about 5 to 7 and a field angle of at a wide angle end equal to or higher than 60°, and that can reduce the thickness of the camera.

2. Description of Related Art

A digital still camera or a video camera using a CCD or a CMOS highly requires a type of a lens by which the thickness of the camera can be reduced in particular. Recently, such a camera also requires a more sophisticated optical specification such as a further higher variable power ratio. A kind of a camera having a thin thickness frequently uses a bending optical system that bends an optical axis by 90 degrees by a reflective optical element (e.g., prism). This is disclosed, for example, in Japanese Patent Laid-Open Publication No. 2005-91465 and Japanese Patent Laid-Open Publication No. 2005-195757 for example.

However, in these zoom lenses according to the prior art using the bending optical system, a 5 group configuration uses a variable power ratio of about 4 and a 6 group configuration uses a variable power ratio of about 5. Thus, it has been difficult to provide a sufficient variable power ratio to the number of lens groups in the configuration.

SUMMARY OF THE INVENTION

It is an object of the present invention to provide a zoom lens and an image pickup apparatus that have a thin thickness in the thickness direction of a camera, that have a wide field angle and a high variable power ratio, and that have favorably-corrected aberrations.

In order to solve the above problems, according to a first aspect of the invention, a zoom lens comprises a first lens group having a positive refractive power, a second lens group having a negative refractive power, a third lens group having a positive refractive power, a fourth lens group having a positive refractive power and a fifth lens group having a negative refractive power, in an order from an object;

wherein a variable power from a wide angle end to a telephoto end is performed by changing distances among the respective lens groups, and the fourth lens group comprises a three cemented lens composed of a positive c1 lens, a negative c2 lens, and a positive c3 lens from an order from the object.

Thus, because the fourth lens group is composed of only three cemented lenses (positive, negative, and positive), it is possible to simplify the group structure, and to improve the productivity. Specifically, when the fourth lens group is composed of three lenses without cementing the three lenses, the lens is divided into two or more lens elements, and error factors such as a lens decentration or a change in a distance between lenses, are increased. When the fourth lens group has a reduced thickness in order to achieve a compact structure in particular, the respective lens elements have an increased decentration error sensitivity, an increased lens figure error sensitivity, an increased thickness/distance error sensitivity or the like. This causes a need to significantly increase the concentricity accuracy and a positioning accuracy in an optical axis direction of the respective lenses, thus deteriorating the productivity. The use of a three cemented lens is advantageous because only a substantially single lens element has to be controlled and thus an improvement of the productivity is relatively easy. When the structure of the three cemented lenses is provided with surface powers of positive, positive, negative, and positive in an order from an object, axial light ray passing a negative power surface can have a relatively short height. Thus, Petzval's sum can be reduced and a field curvature can be suppressed.

The three cemented lens preferably satisfies following conditional expressions;

$$0.15 < nc2 - nc1 \quad (1)$$

$$35 < vc1 - vc2 < 70 \quad (2)$$

wherein:

nc1: a refractive index at a d-line of the c1 lens
vc1: an Abbe number of the c1 lens
nc2: a refractive index at a d-line of the c2 lens
vc2: an Abbe number of the c2 lens.

The three cemented lens preferably satisfies following conditional expressions;

$$0.2 < nc2 - nc1 \quad (3)$$

$$40 < vc1 - vc2 < 65 \quad (4)$$

wherein:

nc1: a refractive index at a d-line of the c1 lens
vc1: an Abbe number of the c1 lens
nc2: a refractive index at a d-line of the c2 lens
vc2: an Abbe number of the c2 lens.

The three cemented lens preferably satisfies following conditional expressions;

$$0.10 < nc2 - nc3 \quad (5)$$

$$25 < vc3 - vc2 < 50 \quad (6)$$

wherein:

nc2: a refractive index at a d-line of the c2 lens
vc2: an Abbe number of the c2 lens
nc3: a refractive index at a d-line of the c3 lens
vc3: an Abbe number of the c3 lens.

The three cemented lens preferably satisfies following conditional expressions;

$$0.15 < nc2 - nc3 \quad (7)$$

$$30 < vc3 - vc2 < 45 \quad (8)$$

wherein:

nc2: a refractive index at a d-line of the c2 lens
vc2: an Abbe number of the c2 lens
nc3: a refractive index at a d-line of the c3 lens
vc3: an Abbe number of the c3 lens.

The c1 lens preferably satisfies a following conditional expression;

$$60 < vc1 < 90 \quad (9)$$

wherein:

vc1: an Abbe number of the c1 lens.

The c1 lens preferably satisfies a following conditional expression;

$$65<\nu c1<85 \quad (10)$$

wherein:
νc1: an Abbe number of the c1 lens.

The c2 lens preferably satisfies a following conditional expression;

$$18<\nu c2<35 \quad (11)$$

wherein:
νc2: an Abbe number of the c2 lens.

The c2 lens preferably satisfies a following conditional expression;

$$20<\nu c2<30 \quad (12)$$

wherein:
νc2: an Abbe number of the c2 lens.

The c3 lens preferably satisfies a following conditional expression;

$$50<\nu c3<80 \quad (13)$$

wherein:
νc3: an Abbe number of the c3 lens.

The c3 lens preferably satisfies a following conditional expression;

$$55<\nu c3<75 \quad (14)$$

wherein:
νc3: an Abbe number of the c3 lens.

When the conditional expressions (1) and (5) are satisfied, differences of the refractive index among the respective lenses of the three cemented lens are increased and the cemented surface can have a flatten curvature radius. Thus, aberration caused in the three cemented lens such as coma aberration or astigmatism can be reduced. When the conditional expressions (3) and (7) are satisfied, the above effect is further increased. On the other hand, an longitudinal chromatic aberration and a chromatic aberration of magnification caused in the fourth lens group can be favorably corrected within ranges of the conditional expressions (2), (6), (9), (11), and (13). When the respective lenses of the three cemented lens have an excessively-small difference in Abbe number, when the first and third lenses of the three cemented lens have an excessively-small Abbe number, or when the second lens of the three cemented lens has an excessively-large Abbe number, the longitudinal chromatic aberration in which the back focus of g-line is shorter than that of d-line is excessively large. This causes an excessively-large chromatic aberration of magnification that reaches an image height at which the g-line is lower than the d-line. When the difference in Abbe number among the respective lenses is excessively large, when the first and third lenses of the three cemented lens have an excessively-large Abbe number, or when the second lens of the three cemented lens has an excessively-small Abbe number, an opposite result is caused, which is also not preferable. When the conditional expressions (4), (8), (10), (12), and (14) are satisfied, the above effect is further increased.

The first lens group preferably comprises a reflective optical element having a function to reflect light ray to bend a light path.

Zoom lenses of illustrative embodiment (which will be described later) are composed of a 5 lens group (positive, negative, positive, positive and negative) or a 6 lens group (positive, negative, positive, positive, negative, and positive). The first lens group has a prism having a function to bend the optical axis by 90 degrees and a variable power is performed by moving the second lens group to an image and moving the fourth lens group to an object. In the embodiment of the present invention, the first lens group comprises a prism as a reflective optical element having an action to reflect light ray to bend a light path. However, the present invention is not limited to this and the reflective optical element may be also a mirror for example. By providing the reflective optical element by the prism, beam passing through the reflective optical system can have a reduced diameter, thus allowing the prism to have a smaller size and allowing the camera to have a reduced thickness.

The reflective optical element preferably is a prism that satisfies a following conditional expression;

$$npr>1.8 \quad (15)$$

wherein:
npr: a refractive index of the prism at the d-line.

The reflective optical element preferably is a prism that satisfies a following conditional expression;

$$npr>1.85 \quad (16)$$

wherein:
npr: a refractive index of the prism at the d-line.

By increasing the refractive index of the prism so as to satisfy the conditional expression (15), light ray passing through the prism can have a reduced height and thus the camera also can have a reduced thickness. When the conditional expression (16) is satisfied, the above effect is further increased. The existence of the negative lens provided at the front side of the prism can reduce an angle of off-axis light ray. Thus, the prism diameter can be further reduced and thus the camera can have a further reduced thickness.

The first lens group preferably comprises a negative lens closer to the object than the reflective optical element and satisfies a following conditional expression;

$$10<dL1PR/(2Y/fW)<15 \quad (17)$$

wherein:
dL1PR: a distance from an apex of the negative lens, which is closer to the object to a portion of the reflective optical element, which is closest to an image
fw: a focal length of an entire system at the wide angle end
2Y: a diagonal length of an image pickup element.

The first lens group preferably comprises a negative lens closer to the object than the reflective optical element and satisfies a following conditional expression;

$$12<dL1PR/(2Y/fW)<14 \quad (18)$$

wherein:
dL1PR: a distance from an apex of the negative lens, which is closer to the object to a portion of the reflective optical element, which is closest to an image
fw: a focal length of an entire system at the wide angle end
2Y: a diagonal length of an image pickup element.

The conditional expression (17) specifies a relation, in the first lens group, among: a distance from a surface of the lens at the front side of the reflective optical element, which is closer to the object, to a surface of the reflective optical element, which is closer to the image; a diagonal length of an image pickup element; and a focal length of the entire lens system at the wide angle end. When a value equal to or higher than a lower limit of the conditional expression is obtained, the distance from a surface of the lens at the front side of the reflective optical element, which is closer to the object to a surface of the reflective optical element, which is closer to the image, is not excessively small with respect to the field angle of the wide angle end. Thus, the off-axis aberration can be satisfactorily corrected in order to reduce the diameter of a front lens element of the wide angle end, thus providing a favorable optical performance. When a value equal to or lower than an upper limit of the conditional expression is obtained, hindering of the compact size due to an excessive high thickness of a camera can be prevented. When the conditional expression (18) is satisfied, the above effect is further increased.

Lenses constituting the first lens group are preferably glass spherical lenses obtained by a grinding finishing.

In order to correct aberrations in a favorable manner, the first lens group can include therein a glass mold aspheric lens or a complex (hybrid) aspheric lens. However, the mold aspheric lens has a problem in that a undulation error in the surface (aspherical surface error) as a manufacturing error tends to be caused. At the telephoto side, variation of aberration due to this undulation error is expanded at a part after the second lens group and transmitted to an imaging surface. The expansion rate increases as the variable power ratio is higher and the telephoto end has a higher focal length. Thus, in the high variable power lens as in the present invention, the first group preferably uses glass spherical lenses obtained by a grinding finishing that can cause a relatively small undulation error.

At least one of positive lenses of the first lens group preferably satisfies a following conditional expression;

$$v1p > 80 \quad (19)$$

wherein:

v1p: an Abbe number of the positive lens of the first lens group.

The high variable power lens as in the present invention has a relatively long focal length at the telephoto end. Thus, chroma aberration due to the secondary spectrum is high and tends to be conspicuous. In order to cope with this, anomalous dispersion glass material or special low-dispersion glass material satisfying the conditional expression (19) can be used for a positive lens of the first lens group to reduce the chroma aberration.

In the zoom lens, the following conditional expression is preferably satisfied;

$$0.5 < f1/(fW \times fT)1/2 < 2.0 \quad (20)$$

f1: a focal length of the first lens group
fW: a focal length of an entire system at the wide angle end
fT: a focal length of the entire system at the telephoto end.

In the zoom lens, the following conditional expression is preferably satisfied;

$$0.8 < f1/(fW \times fT)1/2 < 1.5 \quad (21)$$

wherein:

f1: a focal length of the first lens group
fW: a focal length of an entire system at the wide angle end
fT: a focal length of the entire system at the telephoto end.

By providing the focal length of the first lens group so that the conditional expression (20) is satisfied, the following advantages can be obtained. Specifically, a value higher than the lower limit of the conditional expression prevents an excessively-high refractive power of the first lens group. Thus, the first lens group can be prevented from increasing aberration or variation of the aberration due to a decentration or a figure error. Furthermore, a value lower than the upper limit of the conditional expression can appropriately secure the positive refractive power of the first lens group, thus reducing the entire length of the zoom lens. When the conditional expression (21) is satisfied, the above effect is further increased.

The second lens group is preferably composed of two negative lenses and one positive lens.

The second lens group composed of two negative lenses and one positive lens can divide the negative power to the two lenses. Thus, distortion aberration or astigmatism that is caused in a wide angle in particular can be suppressed.

A positive lens of the second lens group preferably satisfies following conditional expressions;

$$n2p > 1.8 \quad (22)$$

$$v2p < 26 \quad (23)$$

wherein:

n2p: a refractive index at a d-line of a positive lens of the second lens group
v2p: an Abbe number of the positive lens of the second lens group.

A positive lens of the second lens group preferably satisfies following conditional expressions;

$$n2p > 1.9 \quad (24)$$

$$v2p < 23 \quad (25)$$

wherein:

n2p: a refractive index at a d-line of a positive lens of the second lens group
v2p: an Abbe number of a positive lens of the second lens group.

By cementing the negative lens with the positive lens and by using high-dispersion glass material having a high refractive index for the positive lens and using glass material for the negative lens that has a lower refractive index than that of the positive lens and that has small dispersion, chroma aberration caused in this lens group is reduced and monochromatic aberration caused in the cemented surface is suppressed. Thus, variation in these aberrations can be suppressed when a variable power is performed. In the case of the positive lens in particular, the conditional expressions (22) and (23) are desirably satisfied. When the conditional expressions (24) and (25) are satisfied, the above effect is further increased. The use of glass material having a high refractive index for the positive lens as described above can reduce Petzval's sum and also can suppress a field curvature.

In the zoom lens, the following conditional expression is preferably satisfied;

$$-1.0 < f2/(fW \times fT)1/2 < -0.2 \quad (26)$$

wherein:

f2: a focal length of the second lens group
fW: a focal length of an entire system at the wide angle end
fT: a focal length of the entire system at the telephoto end.

In the zoom lens, the following conditional expression is preferably satisfied;

$$-0.6 < f2/(fW \times fT)1/2 < -0.3 \quad (27)$$

wherein:

f2: a focal length of the second lens group
fW: a focal length of an entire system at the wide angle end
fT: a focal length of the entire system at the telephoto end.

By providing a focal length of the second lens group to satisfy the conditional expression (26), the following advantages-are obtained. Specifically, a value higher than the lower limit of the conditional expression can appropriately maintain the negative refractive power of the second lens group and the displacement of the second lens group for obtaining a desired zoom ratio can be reduced. Thus, the entire length of the zoom lens can be reduced. A value lower than the upper limit of the conditional expression prevents the negative refractive power of the second lens group from becoming excessively high. Thus, the second lens group can be prevented from increasing aberration or variation of aberration due to an decentration or a figure error. When the conditional expression (27) is satisfied, the above effect is further increased.

The third lens group preferably has an aperture stop closer to the lens surface positioned closest to the object or the image of the third lens group and has an aspheric surface at at least one surface.

The third lens group is preferably composed of one positive lens.

The third lens group has smaller power than those of other lens groups and thus the simple structure of only a single positive lens can favorably correct chroma aberration or the like. Thus, an area occupied by the third lens group can be small, thus providing an advantage in that an area in which the second lens group and the fourth lens group can be moved for a variable power can be secured easily. The aperture stop is provided in the vicinity of the third lens group corresponding to a substantial center of this zoom lens. As a result, an off-axis aberration can be corrected in a well-balanced manner and the difference in the diameter between a front lens element and a rear lens element can be small. Thus, the shape of a lens unit in the thickness direction of the camera can be made flat easily, thus providing an advantage in that the layout in the camera can be carried out easily for example. Furthermore, the third lens group is positioned sufficiently away from an image pickup element. Thus, a telecentric characteristic required by a CCD or CMOS optical system can be secured sufficiently. In the present invention, this lens group is located closest to the aperture. Thus, the use of an aspheric surface can correct a spherical aberration, coma aberration or the like in a favorable manner. A beam passing therethrough is relatively thick at on-axis and off-axis and thus tends to be influenced by a figure error of the lens surface in this zoom lens. Thus, a undulation error (aspheric error) that tends to be caused in the surface of a mold aspheric lens is preferably sufficiently suppressed.

The third lens group is preferably fixed for a variable power.

The third lens group fixed for a variable power prevents the third lens group from being moved with an aperture. Thus, the driving system can be simplified.

The fourth lens group has preferably an aspheric surface at at least one surface.

By using an aspheric surface for the fourth lens group, it is possible to correct coma aberration, astigmatism or the like in a favorable manner.

The aspheric surface of the fourth lens group is preferably provided at a position closest to an image of the fourth lens group.

When an aspheric surface is provided at a position closest to an image of the fourth lens group, the aspheric surface can be sufficiently away from an aperture, thus increasing the effect for correcting an off-axis aberration.

The fifth lens group is preferably composed of one negative 5n lens.

The 5n lens preferably has an aspheric surface at at least one surface.

The 5n lens preferably is a plastic lens and satisfies a following conditional expression;

$$|fW/f5n|<0.8 \qquad (28a)$$

wherein:
fw: a focal length of the entire system at a wide angle end
f5n: a focal length of the 5n lens.

The fifth lens group preferably comprises a plastic lens and satisfies a following conditional expression;

$$|fW/f5P1|<0.8 \qquad (28)$$

wherein:
fw: a focal length of an entire system at the wide angle end
f5P1: a focal length of the plastic lens of the fifth lens group.

An aspheric surface is added to the plastic lens with relative ease. The use of an aspheric lens allows the fifth lens group to mainly correct astigmatism in a favorable manner. The use of a plastic lens also contributes to a reduced cost of the lens. The fifth lens group also may use a glass mold aspheric surface or a complex (hybrid) aspheric surface to maintain a favorable optical performance. When the conditional expression (28) is satisfied, a plastic lens is prevented from having an excessively high power. Thus, variation of focusing or aberration due to a temperature change can be suppressed. When the conditional expression (29) is satisfied, the above effect is further increased.

The 5n lens is preferably a plastic lens and satisfies the following conditional expression;

$$|fW/f5n|<0.5 \qquad (29)$$

wherein:
fw: a focal length of the entire system at a wide angle end
f5n: a focal length of a 5n lens.

The zoom lens preferably comprises a sixth lens group having a positive refractive power.

The present invention includes zoom lenses having a 5 group configuration (positive, negative, positive, positive, and negative) and a 6 group configuration (positive, negative, positive, positive, negative, and positive). The latter configuration in particular is advantageous because the sixth positive lens group can maintain a favorable telecentric characteristic. In an illustrative embodiment for the 6 group configuration (which will be described later), the fifth lens group and the sixth lens group are composed of a single lens, respectively. In this type of lens, on-axis light ray passing through the fifth lens group and the sixth lens group has a relatively short height and the beam diameter is relatively small. Thus, this group does not always require an achromatization by two or more positive and negative lenses for example because this group has a small influence on the optical performance of the entire lens system and may function with a simple structure of only a single lens. When this group uses a plastic lens having a lighter weight than that of glass, a load to a driving mechanism for moving the lens group for a zooming or focusing operation can be further reduced.

The sixth lens group has preferably an aspheric surface at at least one surface.

The sixth lens group is preferably fixed for a variable power.

The sixth lens group is preferably composed of one positive 6p lens.

The 6p lens is preferably a plastic lens and satisfies the following conditional expression;

$$fW/f6p<0.8 \quad (30a)$$

wherein:
fw: a focal length of the entire system at a wide angle end
f6p: a focal length of the 6p lens.

The sixth lens group preferably comprises a plastic lens and satisfies a following conditional expression;

$$fW/f6P1<0.8 \quad (30)$$

wherein:
fw: a focal length of an entire system at the wide angle end
f6P1: a focal length of the plastic lens of the sixth lens group.

The 6p lens is preferably a plastic lens and satisfies the following conditional expression;

$$fW/f6p<0.5 \quad (31)$$

wherein:
fw: a focal length of an entire system at the wide angle end
f6p: a focal length of the 6p lens.

An aspheric surface is added to a plastic lens with a relative ease. The use of an aspheric lens allows the sixth lens group to mainly correct distortion in a favorable manner. The use of a plastic lens also contributes to a reduced cost of the lens. The sixth lens group also may use a glass mold aspheric surface or a complex (hybrid) aspheric surface to maintain a favorable optical performance. When the conditional expression (30) is satisfied, a plastic lens is prevented from having an excessively high power. Thus, variation of focusing or aberration due to a temperature change can be suppressed. When the conditional expression (31) is satisfied, the above effect is further increased.

In the zoom lens, the following conditional expression is preferably satisfied;

$$0.03<m5imax/(fW\times fT)1/2<0.2 \quad (32)$$

wherein:
m5i max: a maximum value of a lateral magnification of a constructional system composed of one or more groups at a rear side of the fifth lens group
fW: a focal length of an entire system at the wide angle end
fT: a focal length of the entire system at the telephoto end.

In the zoom lens, the following conditional expression is preferably satisfied;

$$0.05<m5imax/(fW\times fT)1/2<0.15 \quad (33)$$

wherein:
m5i max: a maximum value of a lateral magnification of a constructional system composed of one or more groups at a rear side of the fifth lens group
fW: a focal length of an entire system at, the wide angle end
fT: a focal length of the entire system at the telephoto end.

The conditional expression (32) specifies a relation between a focal length of the entire system at a wide angle end and a telephoto end and a lateral magnification of a constructional system of the fifth lens group as a focusing group and after the fifth lens group. When a value equal to or higher than a lower limit of the conditional expression is obtained, this can prevent an excessive large displacement in focusing due to an excessively small focusing movement change of the focus lens, thus maintaining the compact size. When a value equal to or lower than an upper limit of the conditional expression is obtained on the other hand, the focusing movement change of the focus lens can be prevented from being excessively large, thus facilitating a focus control. Furthermore, a deteriorated optical performance due to aberrations caused in this group such as astigmatism or distortion aberration, an decentration error of a lens, a figure error of a lens surface, an error of the thickness of a lens or an interval of lenses can be reduced, thus maintaining a favorable optical performance. It is desirable that the conditional expression (33) is preferably satisfied.

When a variable power is performed, at least three lens groups of the zoom lens are preferably moved.

In a conventional zoom lens composed of a 4 group configuration (positive, negative, positive, and positive), a variable power is frequently performed only by the movement of the second group. In this method, the variable power load is applied only to the one group. Furthermore, when this structure is tried to have a compact size, an increased power in a variable power group causes deteriorated optical performance and increased error sensitivity and, when the movement for variable power is increased in order to prevent such problems, the compactness in size tends to be lost. In contrast with this, the variable power as in the present invention by moving two or more lens groups can separately assign the variable power function to the respective groups. This can prevent an excessive increase of power of a group and the excessively-increased movement for variable power, thus providing both of a compact size and a favorable optical characteristic. The suppressed movement of the second group in particular can provide with a reduced distance between apertures from the first lens group. Thus, a diameter of a front lens element and a prism diameter also can be reduced, thus providing a camera having a reduced thickness. Furthermore, a displacement of a focus caused when a variable power is performed by moving the second lens group and the fourth lens group is corrected by moving other lens groups. This can achieve a zoom lens that has a compact size and a favorable optical characteristic while providing a high variable power.

The zoom lens preferably performs a focusing from infinity to finite distance by moving at least the fifth lens group.

As for a lens group moving mode, it is desirable that the sixth lens group is fixed and the fifth lens group is moved during a variable power and a focusing. Specifically, by treating the sixth lens group as a fixed group, the sealing performance in the vicinity of an image pickup element is enhanced and prevention of dust ingression for example can be expected. The fifth lens group has a structure by which front and rear air intervals can be easily secured and that is simpler than other movable groups. Thus, even when the fifth lens group is moved in order to correct a focusing variation due to a variable power by the second and the fourth lens groups or even when the fifth lens group functions as a focusing lens for a focusing in a short distance focusing, a driving mechanism load can be depressed small.

The zoom lens has preferably a variable power ratio equal to or higher than 4.5.

The zoom lens has preferably a variable power ratio equal to or higher than 6.5.

According to the second aspect of the invention, the image pickup apparatus comprises the above-described zoom lens and an image pickup element.

When the image pickup apparatus of the present invention comprises an infrared cut filter by providing a coat processing to a surface of a low-pass filter to be a reflection-type filter, a need for additional inserting of an absorption-type infrared cut filter glass is eliminated. Thus, the thickness in the optical axis direction can be reduced, thus providing an advantageous compact structure.

In the present invention, the term "plastic lens" means a lens that uses plastic material as base material, that is formed of plastic material in which particles having a small diameter are dispersed. Plastic lens also includes such a lens having a plastic volume ratio of 50% or more, a undulation as a lens having the surface which is subjected to a coating process for the purpose of preventing reflection or improving a surface strength.

Recently, it has been found that plastic material can be mixed with inorganic microparticles to reduce the temperature change of the plastic material. Specifically, it has been generally known, when transparent plastic material is mixed with microparticles, light is scattered to reduce the transmission and thus the material is hardly used as optical material. However, when the size of the microparticle is made smaller than the wavelength of the transmission beam, the light scattering can be substantially prevented. While plastic material has a declined refractive index due to a temperature increase, an inorganic particle has a higher refractive index with an increase of a temperature. Thus, these temperature dependencies can be used so that the dependencies cancel each other to have almost no change in the refractive index. Specifically, inorganic particles having the maximum length of 20 nanometers or less are dispersed in plastic material as a base material, thereby providing plastic material having a refractive index that has a very small temperature dependency. For example, microparticles of niobium oxide (Nb2O5) can be dispersed in acryl to reduce the change of a refractive index due to a temperature change.

Here, the change of a refractive index due to a temperature change will be described in detail. The change of a refractive index due to a temperature change (which is represented as "A") can be represented, based on the Lorenz-Lorenz formula, by differentiating the refractive index "n" by the temperature "t".

$$A = \frac{(n^2 + 2)(n^2 - 1)}{6n} \left\{ (-3\alpha) + \frac{1}{[R]} \frac{\partial [R]}{\partial t} \right\}$$ Formula 1 where
α: linear coefficient of expansion
[R]: molecular refraction

In the case of plastic material, the first term in the formula has a larger contribution than that by the second term and thus the contribution by the second term can be ignored. For example, in the case of PMMA resin, the linear coefficient of expansion α is $7 \times 10^{-5}$. When the linear coefficient of expansion α is substituted in the above formula, $A = -1.2 \times 10^{-4}$[/degrees C.] is established, which is almost equal to an actual measurement value.

Specifically, the change A of a refractive index due to a temperature change, which conventionally has been about $-1.2 \times 10^{-4}$[/degrees C.], is preferably suppressed to be lower than an absolute value of $8 \times 10^{-5}$[/degrees C.]. Preferably, the change A of a refractive index due to a temperature change is lower than an absolute value of $6 \times 10^{-5}$[/degrees C.]. With regards to plastic materials applicable to the present invention, the changes A of a refractive index due to a temperature change (=dn/dT) are shown in Table 1.

TABLE 1

| PLASTIC MATERIAL | A (APPROXIMATE VALUE)[$10^{-5}$/° C.] |
|---|---|
| POLYESTER BASE | −14 |
| POLYOLEFIN BASE | −11 |
| POLYCARBONATE BASE | −14 |

By doing this, a zoom lens and an image pickup apparatus can be provided by which a camera has a reduced thickness in the thickness direction, that have a wide field angle and a high variable power ratio, and that have favorably-corrected aberrations.

BRIEF DESCRIPTION OF THE DRAWINGS

The present invention will become fully understood from the detailed description given hereinafter and the accompanying drawings given by way of illustration only, and thus are not intended as a definition of the limits of the present invention, wherein:

FIGS. 2A to 2C are aberration diagrams illustrating the spherical aberration, astigmatism, and distortion aberration of the zoom lens according to Illustrative Embodiment 1.

FIGS. 4A to 4C are aberration diagrams illustrating the spherical aberration, astigmatism, and distortion aberration of the zoom lens according to Illustrative Embodiment 2.

FIGS. 6A to 6C are aberration diagrams illustrating the spherical aberration, astigmatism, and distortion aberration of the zoom lens according to Illustrative Embodiment 3.

FIG. 7 is a cross-sectional view at a wide angle end of a zoom lens according to Illustrative Embodiment 4.

FIGS. 8A to 8C are aberration diagrams illustrating the spherical aberration, astigmatism, and distortion aberration of the zoom lens according to Illustrative Embodiment 4.

FIGS. 10A to 10C are aberration diagrams illustrating the spherical aberration, astigmatism, and distortion aberration of the zoom lens according to Illustrative Embodiment 5.

FIGS. 14A to 14C are aberration diagrams illustrating the spherical aberration, astigmatism, and distortion aberration of the zoom lens according to Illustrative Embodiment 7.

PREFERRED EMBODIMENT OF THE INVENTION

Figure 15:
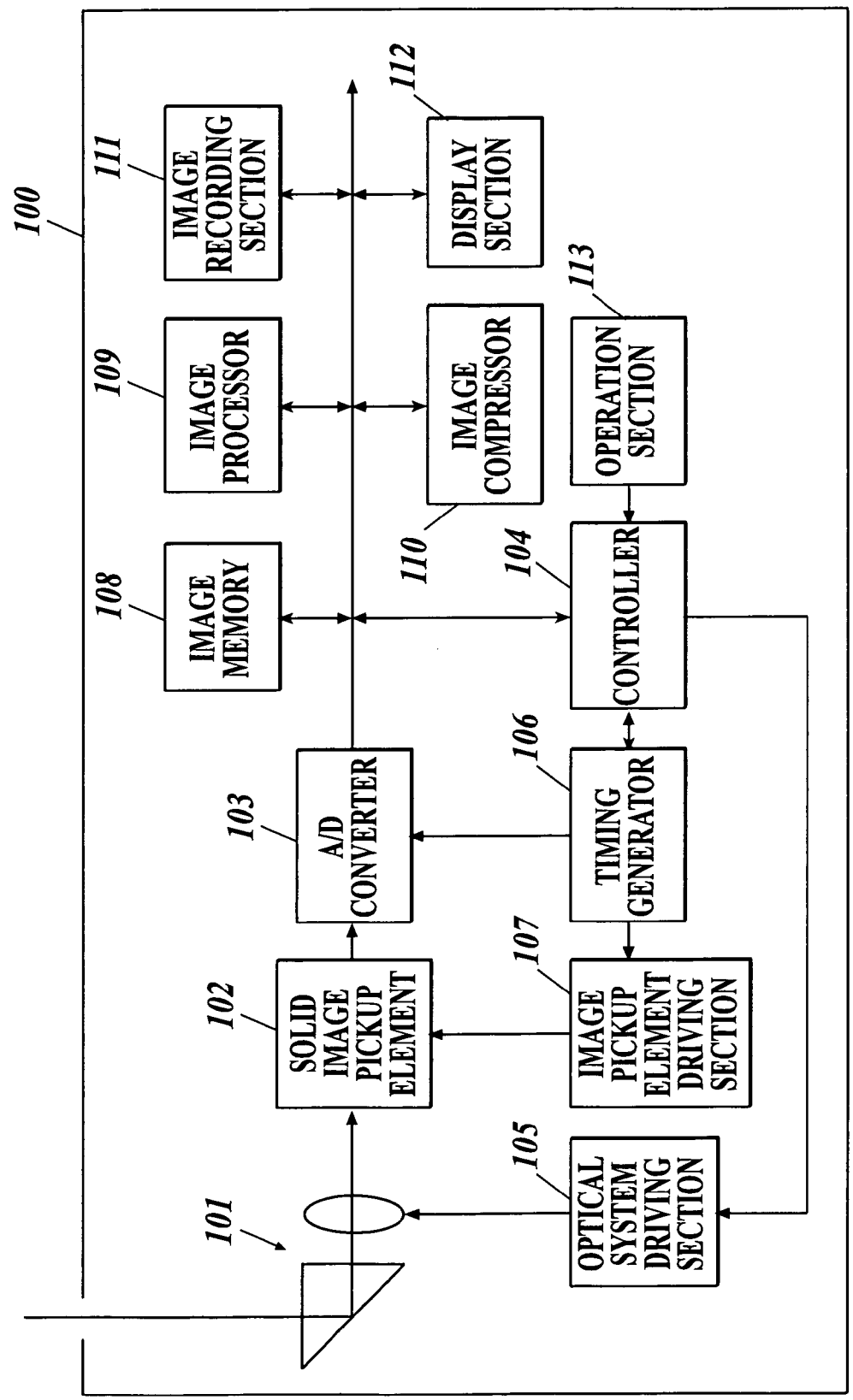
FIG. 15 is a block diagram illustrating an image pickup apparatus 100.
Figure 16:
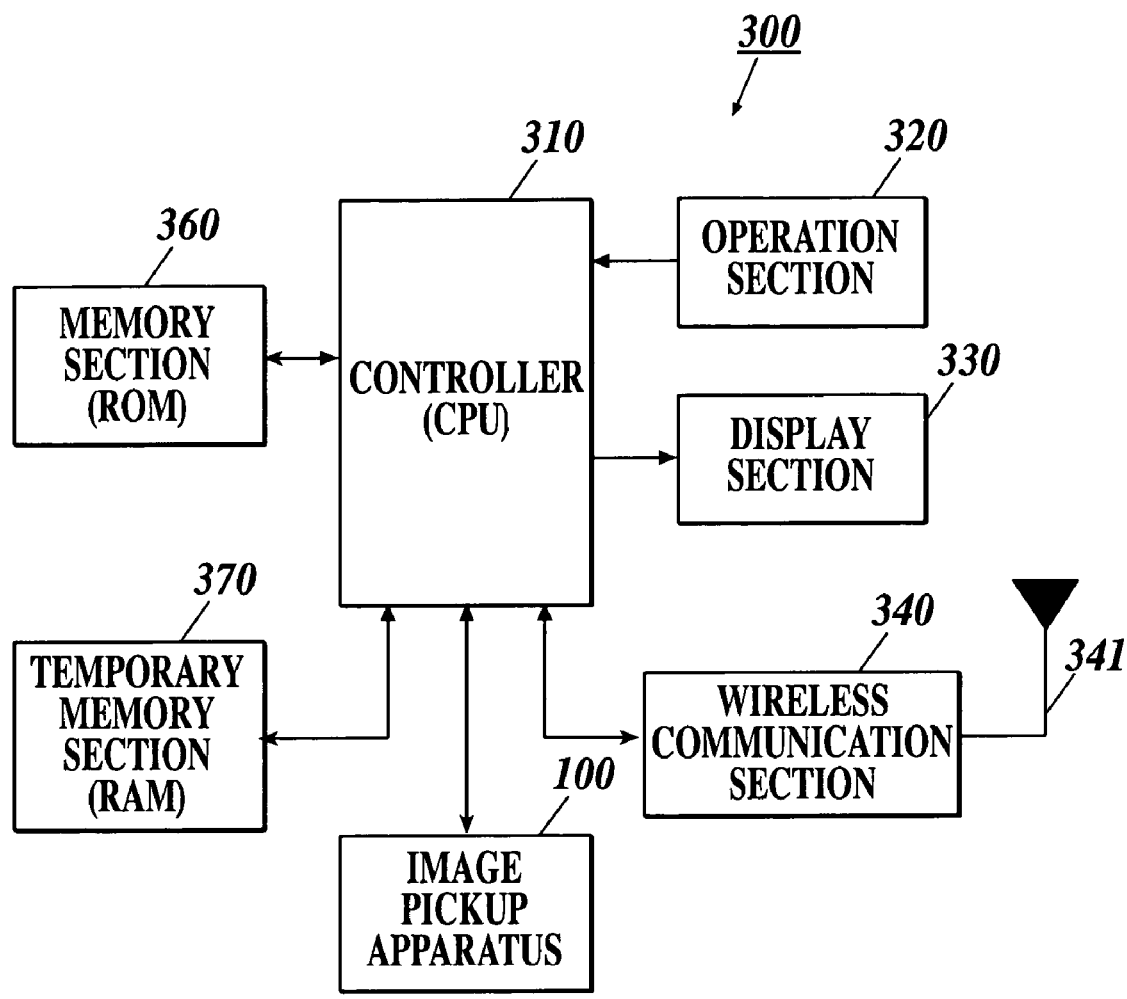
FIG. 16 is a block diagram illustrating an internal structure of a mobile phone 300.

With reference to FIG. 15 and FIG. 16, an image pickup apparatus 100 including a zoom lens according to an embodiment of the present invention will be described. FIG. 15 is a block diagram illustrating the image pickup apparatus 100.

As shown in FIG. 15, the image pickup apparatus 100 is structured to include; a zoom lens 101; a solid image pickup element 102; an A/D converter 103; a controller 104; an optical system driving section 105; a timing generator 106; an image pickup element driving section 107; an image memory 108; an image processor 109; an image compressor 110; an image recording section 111; a display section 112; and an operation section 113.

The zoom lens 101 has a function to image a subject image in an imaging area of the solid image pickup element 102. The solid image pickup element 102 is an image pickup element such as a CCD or CMOS and subjects incoming light to a photoelectric conversion for the respective colors of R, G. and B to output the analog signal. The A/D converter 103 converts the analog signal to digital image data.

The controller 104 controls the respective sections of the image pickup apparatus 100. The controller 104 includes a Central Processing Unit (CPU), a Random Access Memory (RAM), and a Read Only Memory (ROM). The controller 104 cooperates with the CPU to execute various processings by various programs read from the ROM and developed to the RAM.

By the control via the controller 104, the optical system driving section 105 controls the driving of the zoom lens 101 in an operation such as variable power, focusing (move of the second lens group G2, the fourth lens group G4, and the fifth lens group G5, which will be described later) or an exposure. The timing generator 106 outputs a timing signal for outputting an analog signal. The image pickup element driving section 107 controls the scanning drive of the solid image pickup element 102.

The image memory 108 stores image data such that the data can be read and written. The image processor 109 subjects the image data to various image processings. The image compressor 110 compresses the data of the imaged subject by a compression technology such as Joint Photographic Experts Group (JPEG). The image recording section 111 records the image data in a recording medium set in a slot (not shown) such as a memory card.

The display section 112 is a color liquid crystal panel for example and displays photographed image data, a through image before photographing, or a screen for various operations for example. The operation section 113 includes a release button and various operations keys for setting various modes or values and outputs information inputted via an operation by a user to the controller 104.

The operation of the image pickup apparatus 100 will be explained. In subject images photographing, a monitoring of the subject image (display of a through image) and the execution of a photographing of the image are performed. In the monitoring, an image of the subject obtained via the zoom lens 101 is imaged in a light-receiving face of the solid image pickup element 102. The solid image pickup element 102 provided at the rear side of the zoom lens 101 performs scanning by the driving by the timing generator 106 and the image pickup element driving section 107 to output an analog signal for one display as a photoelectric-converted output corresponding to an optical image imaged for every fixed cycle.

This analog signal is appropriately subjected to a gain adjustment for the respective R, G, and B primary colors before being converted to digital data by the A/D converter 103. This digital data is subjected, by the image processor 109, to a color process processing including a pixel interpolation processing and a γ correction processing to generate a brightness signal Y and color difference signals Cb and Cr (image data) as digital values. These signals are stored in the image memory 108 and are periodically read to generate a video signal. The video signal is outputted to the display section 112.

This display section 112 functions as an electronic finder in the monitoring operation to display the imaged image in a real-time manner. In this status, based on an input for an operation by a user via the operation section 113, the optical system driving section 105 drives, as required, the zoom lens 101 to set a variable power, a focusing, a exposure or the like.

In the monitoring status as described above, with a timing at which a user wants to photograph a still image, the user operates a release button of the operation section 113, thereby allowing the still image data to be photographed. In accordance with the operation of the release button, one piece of image data stored in the image memory 108 is read out and is compressed by the image compressor 110. The compressed image data is recorded in a recording medium by the image recording section 111.

It is noted that the above description for the respective embodiments and illustrative embodiments shows an example of preferable zoom lens and image pickup apparatus according to the present invention and do not limit the present invention.

For example, although the respective embodiments and illustrative embodiments have described an example of a digital still camera as an image pickup apparatus including a zoom lens, the present invention is not limited to this. The present invention also can be applied to other devices such as a video camera, a mobile phone having an imaging function, or a mobile terminal at least having an imaging function (e.g., Personal Handyphone System (PHS), Personal Digital Assistant (PDA)).

Alternatively, an image pickup apparatus including a zoom lens also may be provided as an imaging unit included in the above apparatus. Here, with reference to FIG. 16, an example of the mobile phone 300 including the image pickup apparatus 100 will be described. FIG. 16 is a block diagram illustrating the internal structure of the mobile phone 300.

As shown in FIG. 16, the mobile phone 300 comprises: a controller (CPU) 310 that comprehensively controls the respective sections and that executes a program depending on a processing; an operation section 320 for inputting an operation of a certain number for example by keys; a display section 330 for displaying an imaged image in addition to predetermined data; a wireless communication section 340 for realizing, via an antenna 341, various information communication with an exterior server for example; an image pickup apparatus 100; a memory section (ROM) 360 that memorizes a system program of the mobile phone 100 and required data such as various processing programs and a terminal ID or the like; and a temporary memory section (RAM) 370 that is used as a work area that temporarily stores therein various processing programs or data to be executed by the controller 310 or data to be processed or image pickup data by the image pickup apparatus 100.

It is noted that the controller 104 of the image pickup apparatus 100 is connected to the controller 310 of the mobile phone 300 so that communication therebetween can be provided. In such a case, the functions of the display section 112 and the operation section 113 shown in FIG. 15 can be played by the mobile phone 300 without causing a change in the basic operation of the image pickup apparatus 100. More specifically, an external connection terminal (not shown) of the image pickup apparatus 100 is connected to the controller 310 of the mobile phone 300 and a release signal is transmitted from the mobile phone 300 to the image pickup apparatus 100. An image signal obtained by the imaging (e.g., brightness signal, color difference signal) is outputted from the image pickup apparatus 100 to the controller 310. Such an image signal is allowed, by the control system of the mobile phone 300, to be memorized by the memory section 360 or to be displayed by the display section 330. Such an image signal also can be transmitted, via the wireless communication section 340, to outside as image information.

Alternatively, an image pickup apparatus including the zoom lens also may have another structure of a camera module. In this case, the image pickup apparatus is structured so that the zoom lens, a controller, an image processor and the like provided on a substrate are arranged. Consequently, the image pickup apparatus is connected via a connector or the like to another structure having a display section and an operation section or the like.

Hereinafter, with reference to the drawings, illustrative embodiments of the zoom lens of the present invention will be described. However, the present invention is not limited to this. Reference numerals used in the respective illustrative embodiments have the following meanings.

f: Focal length of the entire system of the zoom lens
R: Curvature radius
d: Distance in axial surface
nd: Refractive index of lens material to the d-line
vd: Abbe number of lens material In an aspheric shape of the respective illustrative embodiments, the apex of the surface is assumed as an origin, the X axis is provided along the direction of the optical axis, and the height "h" extends in the direction vertical to the optical axis and these reference numerals are represented by Formula 2 shown below.

$$X = \frac{h^2/R}{1 + \sqrt{1 - (1+K)h^2/R^2}} + \sum A_i h^i \qquad \text{Formula 2}$$

where
$A_i$: i-th aspheric surface coefficient
R: curvature radius
K: conic constant In the following description (including the description for the lens data of the tables), an exponent of 10 (e.g., $2.5 \times 10^{-02}$) is represented by E (e.g., 2.5E-02).

Illustrative Embodiment 1

Figure 1:
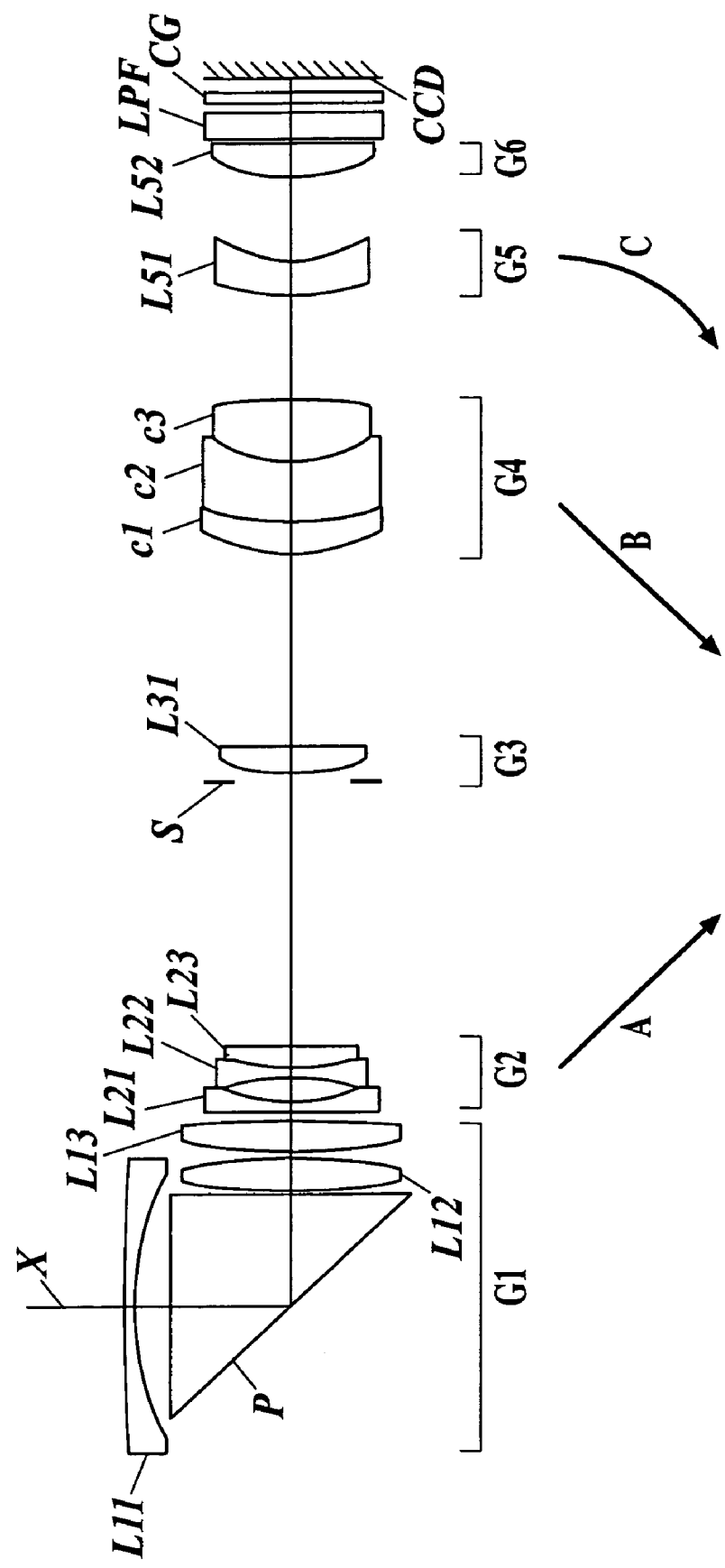
FIG. 1 is a cross-sectional view at a wide angle end of a zoom lens according to Illustrative Embodiment 1.

Table 2 shows lens data for a zoom lens according to Illustrative Embodiment 1. FIG. 1 is a cross-sectional view at a wide angle end of the zoom lens according to Illustrative Embodiment 1. FIGS. 2A to 2C are aberration diagrams illustrating the spherical aberration, astigmatism, and distortion aberration of the zoom lens according to Illustrative Embodiment 1. Here, FIG. 2A is an aberration diagram at a wide angle end. FIG. 2B is an aberration diagram at an intermediate part. FIG. 2C is an aberration diagram at a telephoto end. In the following description, these aberration diagrams will be described based on an assumption that the solid line and the dotted line in the spherical aberration diagram represent the d-line and the g-line, respectively and the solid line and the dotted line in the astigmatism diagram represent a sagittal field and a meridional field, respectively.

TABLE 2

ILLUSTRATIVE EMBODIMENT 1

| SURFACE NO. | R(mm) | d(mm) | $n_d$ | $v_d$ |
|---|---|---|---|---|
| 1 | 101.004 | 0.60 | 1.84666 | 23.8 |
| 2 | 18.104 | 1.97 | | |
| 3 | ∞ | 12.13 | 1.90366 | 31.32 |
| 4 | ∞ | 0.20 | | |
| 5 | 65.254 | 1.71 | 1.48749 | 70.2 |
| 6 | −29.601 | 0.20 | | |
| 7 | 21.916 | 1.79 | 1.72916 | 54.7 |
| 8 | −105.352 | d1 (CHANGEABLE) | | |
| 9 | −177.704 | 0.55 | 1.88300 | 40.8 |

TABLE 2-continued

| 10 | 9.761 | 1.26 | | |
|---|---|---|---|---|
| 11 | −12.449 | 0.50 | 1.77250 | 49.6 |
| 12 | 11.287 | 1.32 | 1.92286 | 20.9 |
| 13 | −112.344 | d2 (CHANGEABLE) | | |
| 14 | 15.772 | 1.46 | 1.58913 | 61.2 |
| 15 | −295.041 | d3 (CHANGEABLE) | | |
| 16 | 8.936 | 2.04 | 1.48749 | 70.2 |
| 17 | 21.411 | 2.94 | 1.75520 | 27.5 |
| 18 | 7.060 | 3.53 | 1.48749 | 70.2 |
| 19 | −28.046 | d4 (CHANGEABLE) | | |
| 20 | 11.805 | 1.85 | 1.60700 | 27 |
| 21 | 6.225 | d5 (CHANGEABLE) | | |
| 22 | 8.884 | 1.69 | 1.53175 | 56.66 |
| 23 | 26.536 | 0.20 | | |
| 24 | ∞ | 1.48 | 1.51633 | 64.1 |
| 25 | ∞ | 0.40 | | |
| 26 | ∞ | 0.50 | 1.51633 | 64.1 |
| 27 | ∞ | | | |

ASPHERIC SURFACE COEFFICIENT

SURFACE NO. 14

K = 0.00000E+00
A4 = −6.00730E−05
A6 = −1.43320E−08
A8 = 8.51570E−09
A10 = −1.40040E−10

SURFACE NO. 19

K = 0.00000E+00
A4 = 3.51660E−04
A6 = 3.47380E−06
A8 = −1.01400E−07
A10 = 4.34850E−09

SURFACE NO. 20

K = 0.00000E+00
A4 = −6.93540E−04
A6 = 2.03580E−05
A8 = −1.77270E−06
A10 = 6.03600E−08

SURFACE NO. 21

K = 0.00000E+00
A4 = −1.26630E−03
A6 = 3.62530E−05
A8 = −3.10720E−06
A10 = 1.16790E−07

SURFACE NO. 22

K = 0.00000E+00
A4 = −9.16940E−04
A6 = 1.98510E−05
A8 = −6.32390E−06
A10 = 4.15310E−07
A12 = −5.33380E−09

SURFACE NO. 23

K = 0.00000E+00
A4 = −1.28870E−03
A6 = −2.33790E−05
A8 = −2.08350E−06
A10 = 2.76500E−07
A12 = −1.90950E−09

| FOCAL LENGTH | d1 | d2 | d3 | d4 | d5 |
|---|---|---|---|---|---|
| 6.45 | 0.600 | 15.064 | 10.584 | 5.720 | 4.602 |
| 16.70 | 7.649 | 8.015 | 4.142 | 8.030 | 8.734 |
| 42.85 | 13.664 | 2.000 | 0.700 | 9.674 | 10.532 |

STOP POSITION: 0.6 mm from front side of surface No. 14
Aspheric lenses of fifth lens group (surface Nos. 20 and 21) and sixth lens group (surface Nos. 22 and 23) are plastic aspheric lenses.

The zoom lens of Illustrative Embodiment 1 is composed of, in an order from an object along the optical axis X, the first lens group G1 having a positive refractive power; the second lens group G2 having a negative refractive power; an aperture stop S; the third lens group G3 having a positive refractive power; the fourth lens group G4 having a positive refractive power; the fifth lens group G5 having a negative refractive power; and the sixth lens group G6 having a positive refractive power. In this structure, a variable power from a wide angle end to a telephoto end can be performed by moving, as shown by an arrow A, the second lens group in the optical axis direction to the image pickup element in a monotonic manner and by moving, as shown by an arrow B, the fourth lens group along the optical axis direction to the object in a monotonic manner and moving, as shown by an arrow C, the fifth lens group in the optical axis direction to the object in a non-linear manner to change the distances among the respective lens groups. The other lens groups are fixed for the variable power.

The first lens group G1 includes, in an order from the object, a negative lens L11, a prism P as a reflective optical element, a positive lens L12, and a positive lens L13. The lenses L11 to L13 are all glass spherical lenses. The second lens group G2 includes, in an order from the object, a negative lens L21, a negative lens L22, and a positive lens L23. The third lens group G3 includes a positive lens L31 at least having an aspheric part at one surface. The fourth lens group G4 is composed of a cemented lens that is obtained by cementing, in an order from the object, a positive c1 lens, a negative c2 lens, and a positive c3 lens and that at least has an aspheric part at the surface closest to the image. The fifth lens group G5 includes a plastic negative lens L51 (also called as 5n lens) that at least has an aspheric part at one surface. The sixth lens group G6 includes a plastic positive lens L61 (also called as 6p lens) that at least has an aspheric part at one surface. The positive lens L61 and an image pickup element CCD have therebetween a low-pass filter LPF and a cover glass CG. By the zoom lenses, the low-pass filter LPF, the cover glass CG, the image pickup element CCD, and an image processing circuit (not shown), the image pickup apparatus is structured.

Illustrative Embodiment 2

Figure 3:
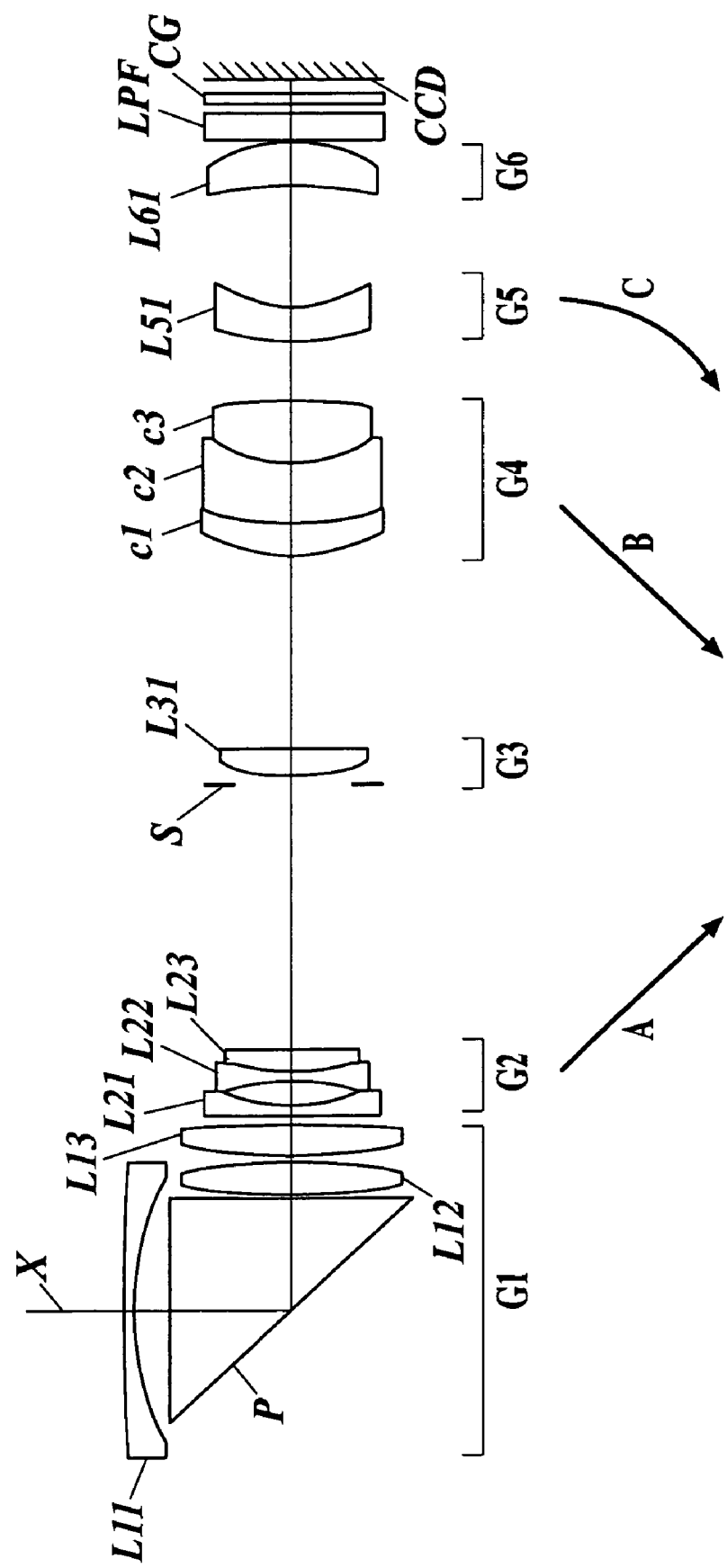
FIG. 3 is a cross-sectional view at a wide angle end of a zoom lens according to Illustrative Embodiment 2.

The lens data of the zoom lens of Illustrative Embodiment 2 is shown in Table 3. FIG. 3 is a cross-sectional view at a wide angle end of the zoom lens of Illustrative Embodiment 2. FIGS. 4A to 4C are aberration diagrams illustrating the spherical aberration, astigmatism, and distortion aberration of the zoom lens according to Illustrative Embodiment 2. Here, FIG. 4A is an aberration diagram at a wide angle end. FIG. 4B is an aberration diagram at an intermediate part. FIG. 4C is an aberration diagram at a telephoto end.

TABLE 3

ILLUSTRATIVE EMBODIMENT 2

| SURFACE NO. | R(mm) | d(mm) | $n_d$ | $v_d$ |
|---|---|---|---|---|
| 1 | 94.007 | 0.60 | 1.84666 | 23.8 |
| 2 | 17.005 | 1.75 | | |
| 3 | ∞ | 12.55 | 1.90366 | 31.32 |
| 4 | ∞ | 0.20 | | |
| 5 | 49.046 | 1.63 | 1.49700 | 81.6 |
| 6 | −41.063 | 0.20 | | |
| 7 | 28.035 | 1.75 | 1.77250 | 49.6 |
| 8 | −61.414 | d1 (CHANGEABLE) | | |
| 9 | −51.589 | 0.55 | 1.83400 | 37.2 |
| 10 | 9.772 | 1.41 | | |
| 11 | −11.698 | 0.50 | 1.77250 | 49.6 |

TABLE 3-continued

| 12 | 15.775 | 1.43 | 1.92286 | 20.9 |
|---|---|---|---|---|
| 13 | −29.690 | d2 (CHANGEABLE) | | |
| 14 | 13.913 | 1.47 | 1.58913 | 61.2 |
| 15 | 58.613 | d3 (CHANGEABLE) | | |
| 16 | 7.916 | 2.26 | 1.49700 | 81.6 |
| 17 | 12.587 | 3.15 | 1.92286 | 20.9 |
| 18 | 6.371 | 3.12 | 1.58313 | 59.4 |
| 19 | 927.306 | d4 (CHANGEABLE) | | |
| 20 | 14.888 | 2.18 | 1.60700 | 27 |
| 21 | 6.584 | d5 (CHANGEABLE) | | |
| 22 | 106.993 | 2.21 | 1.53175 | 56.66 |
| 23 | −11.545 | 0.20 | | |
| 24 | ∞ | 1.48 | 1.51633 | 64.1 |
| 25 | ∞ | 0.40 | | |
| 26 | ∞ | 0.50 | 1.51633 | 64.1 |
| 27 | ∞ | | | |

ASPHERIC SURFACE COEFFICIENT

SURFACE NO. 10

K = 0.00000E+00
A4 = −5.02440E−05
A6 = −1.53070E−06
A8 = 1.28500E−07
A10 = −4.08560E−09

SURFACE NO. 14

K = 0.00000E+00
A4 = −5.59050E−05
A6 = −6.09110E−07
A8 = 8.73400E−08
A10 = −2.91490E−09

Surface No. 19

K = 2.38160E−10
A4 = 6.18360E−04
A6 = 1.10950E−05
A8 = 2.43670E−09
A10 = 2.07250E−08

SURFACE NO. 20

K = 0.00000E+00
A4 = −3.65240E−04
A6 = 3.11970E−06
A8 = 5.68240E−07

SURFACE NO. 21

K = 0.00000E+00
A4 = −6.48700E−04
A6 = 1.33130E−05
A8 = 8.97800E−07

SURFACE NO. 22

K = 0.00000E+00
A4 = −1.45570E−03
A6 = 2.29150E−05
A8 = 6.01450E−07
A10 = −1.41200E−08
A12 = −5.33380E−09

SURFACE NO. 23

K = 0.00000E+00
A4 = −1.99630E−03
A6 = 1.16880E−04
A8 = −4.17380E−06
A10 = 4.44770E−08
A12 = −1.90950E−09

| FOCAL LENGTH | d1 | d2 | d3 | d4 | d5 |
|---|---|---|---|---|---|
| 6.45 | 0.589 | 16.434 | 9.813 | 3.861 | 5.164 |
| 16.70 | 8.360 | 8.663 | 4.084 | 5.905 | 8.851 |
| 42.85 | 15.023 | 2.000 | 0.700 | 8.513 | 9.627 |

Stop position: 0.6 mm from front side of surface No. 14
Aspheric lenses of fifth lens group (surface Nos. 20 and 21) and sixth lens group (surface Nos. 22 and 23) are plastic aspheric lenses.

The zoom lens of Illustrative Embodiment 2 is composed of, in an order from the object along the optical axis X, the first lens group G1 having a positive refractive power; the second lens group G2 having a negative refractive power; the aperture stop S; the third lens group G3 having a positive refractive power; the fourth lens group G4 having a positive refractive power; the fifth lens group G5 having a negative refractive power; and the sixth lens group G6 having a negative refractive power. In this structure, a variable power from a wide angle end to a telephoto end can be performed by moving, as shown by the arrow A, the second lens group in the optical axis direction to the image pickup element in a monotonic manner and by moving, as shown by the arrow B, the fourth lens group in the optical axis direction to the object in a monotonic manner and moving, as shown by the arrow C, the fifth lens group in the optical axis direction to the object in a non-linear manner to change the distances among the respective lens groups. The other lens groups are fixed for the variable power.

The first lens group G1 includes, in an order from the object, a negative lens L11, a prism P as a reflective optical element, a positive lens L12, and a positive lens L13. The lenses L11 to L13 are all glass spherical lenses. The second lens group G2 includes, in an order from the object, a negative lens L21, a negative lens L22, and a positive lens L23. The third lens group G3 includes a positive lens L31 at least having an aspheric part at one surface. The fourth lens group G4 is composed of a cemented lens that is obtained by cementing, in an order from the object, a positive c1 lens, a negative c2 lens, and a positive c3 lens and that at least has an aspheric part at the surface closest to the image. The fifth lens group G5 includes a plastic negative lens L51 (also called as 5n lens) that at least has an aspheric part at one surface. The sixth lens group G6 includes a plastic negative lens L61 (also called as 6p lens) that at least has an aspheric part at one surface. The negative lens L61 and an image pickup element CCD have therebetween the low-pass filter LPF and the cover glass CG. By the zoom lenses, the low-pass filter LPF, the cover glass CG, the image pickup element CCD, and an image processing circuit (not shown), the image pickup apparatus is structured.

Illustrative Embodiment 3

Figure 5:
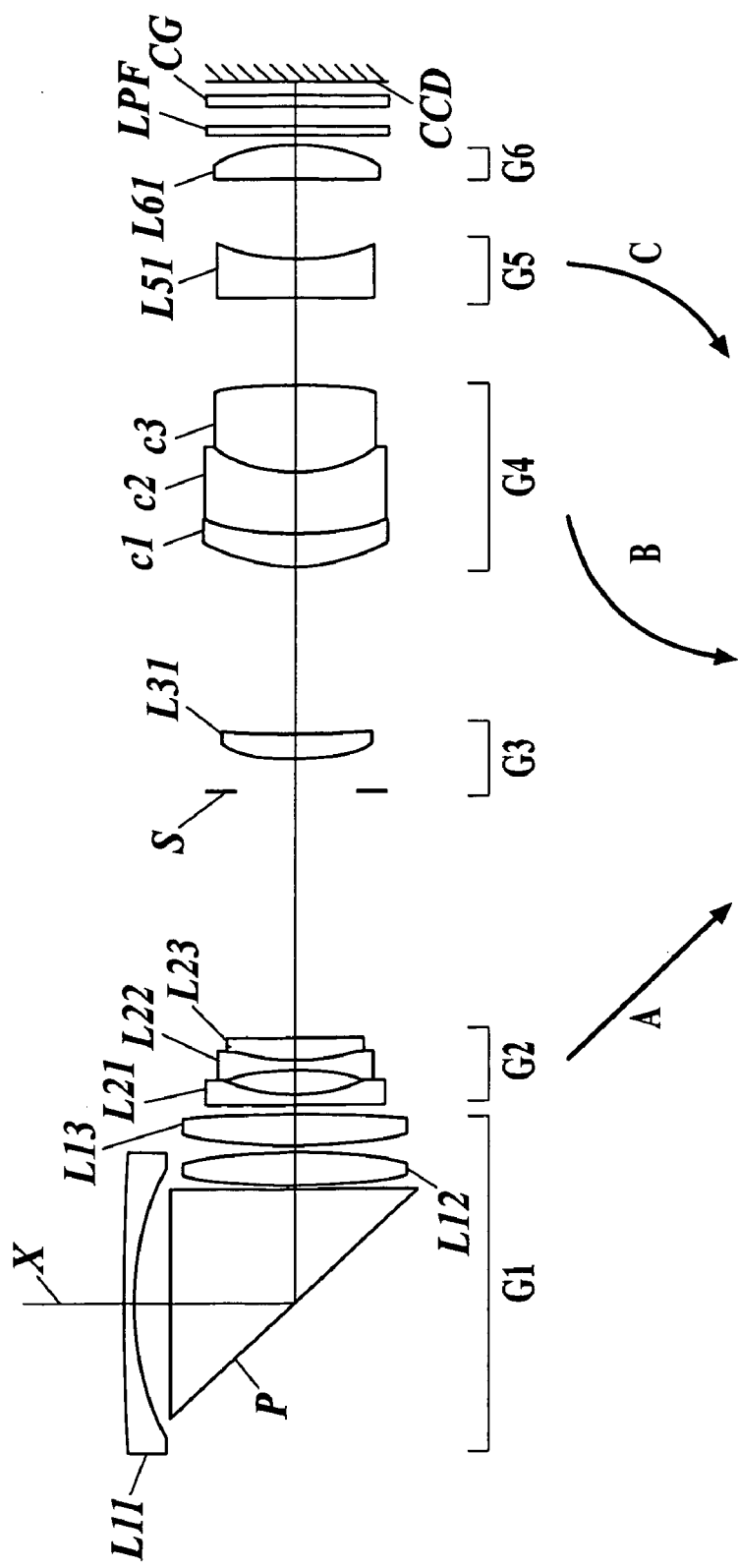
FIG. 5 is a cross-sectional view at a wide angle end of a zoom lens according to Illustrative Embodiment 3.

The lens data of the zoom lens of Illustrative Embodiment 3 is shown in Table 4. FIG. 5 is a cross-sectional view at a wide angle end of the zoom lens of Illustrative Embodiment 3. FIGS. 6A to 6C are aberration diagrams illustrating the spherical aberration, astigmatism, and distortion aberration of the zoom lens according to Illustrative Embodiment 3. Here, FIG. 6A is an aberration diagram at a wide angle end. FIG. 6B is an aberration diagram at an intermediate part. FIG. 6C is an aberration diagram at a telephoto end.

TABLE 4

ILLUSTRATIVE EMBODIMENT 3

| SURFACE NO. | R(mm) | d(mm) | $n_d$ | $v_d$ |
|---|---|---|---|---|
| 1 | 130.695 | 0.60 | 1.84666 | 23.8 |
| 2 | 17.724 | 1.98 | | |
| 3 | ∞ | 11.92 | 1.90366 | 31.32 |
| 4 | ∞ | 0.20 | | |
| 5 | 91.833 | 1.87 | 1.49700 | 81.6 |
| 6 | −21.652 | 0.20 | | |
| 7 | 17.995 | 1.92 | 1.72916 | 54.7 |
| 8 | −559.659 | d1 (CHANGEABLE) | | |
| 9 | −59.282 | 0.55 | 1.88300 | 40.8 |
| 10 | 9.674 | 1.08 | | |
| 11 | −13.806 | 0.50 | 1.72916 | 54.7 |
| 12 | 9.701 | 1.28 | 1.92286 | 20.9 |
| 13 | 369.171 | d2 (CHANGEABLE) | | |
| 14 | 12.641 | 1.48 | 1.58313 | 59.4 |
| 15 | 48.845 | d3 (CHANGEABLE) | | |
| 16 | 9.445 | 1.30 | 1.48749 | 70.2 |
| 17 | 16.303 | 4.49 | 1.84666 | 23.8 |
| 18 | 6.600 | 4.12 | 1.58313 | 59.4 |
| 19 | −27.769 | d4 (CHANGEABLE) | | |
| 20 | 90.844 | 2.50 | 1.60700 | 27 |
| 21 | 10.739 | d5 (CHANGEABLE) | | |
| 22 | 49.869 | 1.87 | 1.53175 | 56.66 |
| 23 | −16.489 | 0.70 | | |
| 24 | ∞ | 0.50 | 1.54880 | 67.0 |
| 25 | ∞ | 1.80 | | |
| 26 | ∞ | 0.50 | 1.51633 | 64.1 |
| 27 | ∞ | | | |

ASPHERIC SURFACE COEFFICIENT

SURFACE NO. 14

K = 0.00000E+00
A4 = −8.81870E−05
A6 = 8.29270E−08
A8 = 2.35520E−08
A10 = −9.97970E−10

SURFACE NO. 19

K = 0.00000E+00
A4 = 4.43470E−04
A6 = −3.55310E−06
A8 = 6.24810E−07
A10 = −1.81570E−08

SURFACE NO. 20

K = 0.00000E+00
A4 = 3.38580E−04
A6 = −2.98030E−05
A8 = 1.85910E−06
A10 = −3.81000E−08

SURFACE NO. 21

K = 0.00000E+00
A4 = 6.11050E−04
A6 = −4.85520E−05
A8 = 3.91420E−06
A10 = −9.58120E−08

SURFACE NO. 22

K = 0.00000E+00
A4 = −3.79160E−04
A6 = 8.46440E−05
A8 = −5.79950E−06
A10 = 2.15180E−07
A12 = −5.33380E−09

SURFACE NO. 23

K = 0.00000E+00
A4 = −7.10530E−04
A6 = 1.05830E−04
A8 = −5.12790E−06
A10 = 9.44460E−08
A12 = −1.90950E−09

| FOCAL LENGTH | d1 | d2 | d3 | d4 | d5 |
|---|---|---|---|---|---|
| 6.49 | 0.700 | 15.725 | 7.565 | 4.389 | 4.119 |
| 16.80 | 6.979 | 9.447 | 2.005 | 5.200 | 8.868 |
| 43.15 | 12.925 | 3.500 | 0.700 | 2.000 | 13.373 |

STOP POSITION: 2.1 mm from front side of surface No. 14
Aspheric lenses of fifth lens group (surface Nos. 20 and 21) and sixth lens group (surface Nos. 22 and 23) are plastic aspheric lenses.

The zoom lens of Illustrative Embodiment 3 is composed of, in an order from the object along the optical axis X, the first lens group G1 having a positive refractive power; the second lens group G2 having a negative refractive power; the aperture stop S; the third lens group G3 having a positive refractive power; the fourth lens group G4 having a positive refractive power; the fifth lens group G5 having a negative refractive power; and the sixth lens group G6 having a negative refractive power. In this structure, a variable power from a wide angle end to a telephoto end can be performed by moving, as shown by the arrow A, the second lens group in the optical axis direction to the image pickup element in a monotonic manner and by moving, as shown by the arrow B, the fourth lens group in the optical axis direction to the object in a monotonic manner and moving, as shown by the arrow C, the fifth lens group in the optical axis direction to the object in a non-linear manner to change the distances among the respective lens groups. The other lens groups are fixed for the variable power.

The first lens group G1 includes, in an order from the object, a negative lens L11, a prism P as a reflective optical element, a positive lens L12, and a positive lens L13. The lenses L11 to L13 are all glass spherical lenses. The second lens group G2 includes, in an order from the object, a negative lens L21, a negative lens L22, and a positive lens L23. The third lens group G3 includes a positive lens L31 at least having an aspheric part at one surface. The fourth lens group G4 is composed of a cemented lens that is obtained by cementing, in an order from the object, a positive c1 lens, a negative c2 lens, and a positive c3 lens and that at least has an aspheric part at the surface closest to the image. The fifth lens group G5 includes a plastic negative lens L51 (also called as 5n lens) that at least has an aspheric part at one surface. The sixth lens group G6 includes a plastic positive lens L61 (also called as 6p lens) that at least has an aspheric part at one surface. The positive lens L61 and an image pickup element CCD have therebetween the low-pass filter LPF and the cover glass CG. By the zoom lenses, the low-pass filter LPF, the cover glass CG, the image pickup element CCD, and an image processing circuit (not shown), the image pickup apparatus is structured.

Illustrative Embodiment 4

The lens data of the zoom lens of Illustrative Embodiment 4 is shown in Table 5. FIG. 7 is a cross-sectional view at a wide angle end of the zoom lens of Illustrative Embodiment 4. FIGS. 8A to 8C are aberration diagrams illustrating the spherical aberration, astigmatism, and distortion aberration of the zoom lens according to Illustrative Embodiment 4. Here, FIG. 8A is an aberration diagram at a wide angle end. FIG. 8B is an aberration diagram at an intermediate part. FIG. 8C is an aberration diagram at a telephoto end.

TABLE 5

ILLUSTRATIVE EMBODIMENT 4

| SURFACE NO. | R(mm) | d(mm) | $n_d$ | $v_d$ |
|---|---|---|---|---|
| 1 | 189.009 | 0.60 | 1.80518 | 25.4 |
| 2 | 21.761 | 2.75 | | |
| 3 | ∞ | 13.30 | 1.84666 | 23.8 |
| 4 | ∞ | 0.40 | | |
| 5 | 54.847 | 0.50 | 1.80518 | 25.4 |
| 6 | 29.830 | 2.31 | 1.49700 | 81.6 |
| 7 | −29.076 | 0.20 | | |
| 8 | 22.298 | 1.94 | 1.80610 | 40.9 |
| 9 | −549.171 | d1 (CHANGEABLE) | | |
| 10 | −152.453 | 0.50 | 1.80610 | 40.9 |
| 11 | 9.462 | 1.61 | | |

TABLE 5-continued

| 12 | −15.011 | 0.50 | 1.72916 | 54.7 |
|---|---|---|---|---|
| 13 | 10.854 | 1.21 | 1.92286 | 20.9 |
| 14 | 232.903 | d2 (CHANGEABLE) | | |
| 15 | 13.427 | 1.30 | 1.58913 | 61.2 |
| 16 | 60.851 | d3 (CHANGEABLE) | | |
| 17 | 7.701 | 2.90 | 1.48749 | 70.2 |
| 18 | 18.359 | 2.95 | 1.80518 | 25.4 |
| 19 | 6.223 | 2.90 | 1.58313 | 59.4 |
| 20 | 57.297 | d4 (CHANGEABLE) | | |
| 21 | 14.357 | 2.50 | 1.60700 | 27 |
| 22 | 5.627 | d5 (CHANGEABLE) | | |
| 23 | 9.216 | 2.30 | 1.53180 | 56.66 |
| 24 | −31.074 | 0.87 | | |
| 25 | ∞ | 1.48 | 1.51633 | 64.1 |
| 26 | ∞ | 0.40 | | |
| 27 | ∞ | 0.50 | 1.51633 | 64.1 |
| 28 | ∞ | | | |

ASPHERIC SURFACE COEFFICIENT

SURFACE NO. 15

K = 0.00000E+00
A4 = −5.65120E−05
A6 = −5.66040E−07
A8 = 7.32810E−08
A10 = −2.51800E−09

SURFACE NO. 20

K = 4.78480E+00
A4 = 6.78090E−04
A6 = 1.21860E−05
A8 = −3.16370E−08
A10 = 3.42120E−08

SURFACE NO. 21

K = 0.00000E+00
A4 = −5.61870E−04
A6 = −3.44940E−05
A8 = 2.17280E−06

SURFACE NO. 22

K = 0.00000E+00
A4 = −1.14850E−03
A6 = −6.67940E−05
A8 = 3.49330E−06

SURFACE NO. 23

K = 0.00000E+00
A4 = −4.24800E−04
A6 = 4.49140E−05
A8 = 3.69680E−08
A10 = −9.89220E−09

SURFACE NO. 24

K = 0.00000E+00
A4 = −9.69820E−04
A6 = 1.01560E−04
A8 = −7.75940E−07
A10 = −3.46810E−08

| FOCAL LENGTH | d1 | d2 | d3 | d4 | d5 |
|---|---|---|---|---|---|
| 6.40 | 0.600 | 16.604 | 8.010 | 5.971 | 2.289 |
| 17.60 | 8.686 | 8.518 | 2.826 | 10.208 | 3.235 |
| 48.60 | 15.204 | 2.000 | 0.700 | 4.468 | 11.102 |

STOP POSITION: 0.2 mm from front side of surface No. 15.
Aspheric lenses of fifth lens group (surface Nos. 21 and 22) and sixth lens group (surface Nos. 23 to 24) are plastic aspheric lenses.

The zoom lens of Illustrative Embodiment 4 is composed of, in an order from the object along the optical axis X, the first lens group G1 having a positive refractive power; the second lens group G2 having a negative refractive power; the aperture stop S; the third lens group G3 having a positive refractive power; the fourth lens group G4 having a positive refractive power; the fifth lens group G5 having a negative refractive power; and the sixth lens group G6 having a negative refractive power. In this structure, a variable power from a wide angle end to a telephoto end can be performed by moving, as shown by the arrow A, the second lens group in the optical axis direction to the image pickup element in a monotonic manner and by moving, as shown by the arrow B, the fourth lens group in the optical axis direction to the object in a monotonic manner and moving, as shown by the arrow C, the fifth lens group in the optical axis direction to the object in a non-linear manner to change the distances among the respective lens groups. The other lens groups are fixed for the variable power.

The first lens group G1 includes, in an order from the object, a negative lens L11, a prism P as a reflective optical element, a positive lens L12 obtained by adhering a negative lens L12a with a positive lens L12b, and a positive lens L13. The lenses L11 to L13 are all glass spherical lenses. The second lens group G2 includes, in an order from the object, a negative lens L21, a negative lens L22, and a positive lens L23. The third lens group G3 includes a positive lens L31 at least having an aspheric part at one surface. The fourth lens group G4 is composed of a cemented lens that is obtained by cementing, in an order from the object, a positive c1 lens, a negative c2 lens, and a positive c3 lens and that at least has an aspheric part at the surface closest to the image. The fifth lens group G5 includes a plastic negative lens L51 (also called as 5n lens) that at least has an aspheric part at one surface. The sixth lens group G6 includes a plastic positive lens L61 (also called as 6p lens) that at least has an aspheric part at one surface. The positive lens L61 and an image pickup element CCD have therebetween the low-pass filter LPF and the cover glass CG. By the zoom lenses, the low-pass filter LPF, the cover glass CG, the image pickup element CCD, and an image processing circuit (not shown), the image pickup apparatus is structured.

Illustrative Embodiment 5

Figure 9:
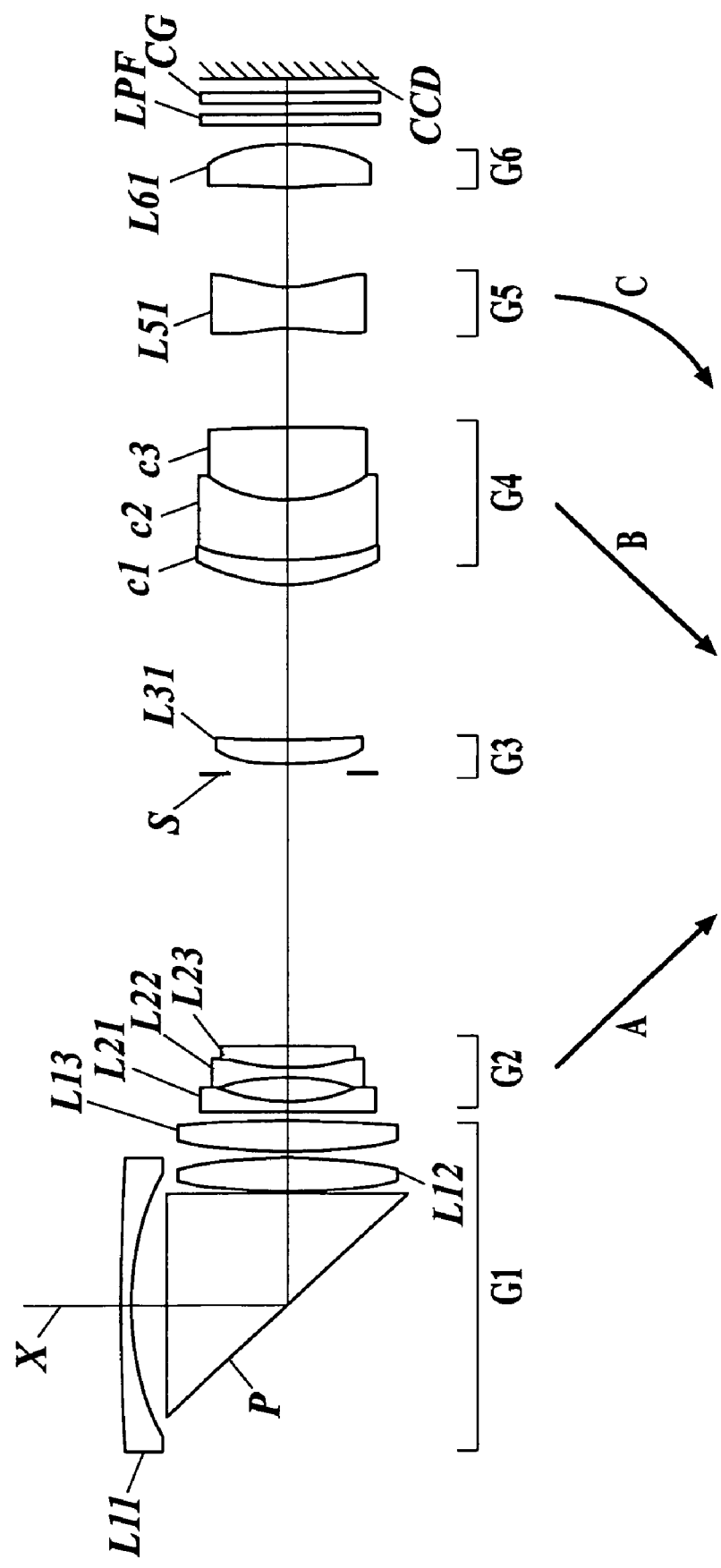
FIG. 9 is a cross-sectional view at a wide angle end of a zoom lens according to Illustrative Embodiment 5.

The lens data of the zoom lens of Illustrative Embodiment 5 is shown in Table 6. FIG. 9 is a cross-sectional view at a wide angle end of the zoom lens of Illustrative Embodiment 5. FIGS. 10A to 10C are aberration diagrams illustrating the spherical aberration, astigmatism, and distortion aberration of the zoom lens according to Illustrative Embodiment 5. Here, FIG. 10A is an aberration diagram at a wide angle end. FIG. 10B is an aberration diagram at an intermediate part. FIG. 10C is an aberration diagram at a telephoto end.

TABLE 6

ILLUSTRATIVE EMBODIMENT 5

| SURFACE NO. | R(mm) | d(mm) | $n_d$ | $v_d$ |
|---|---|---|---|---|
| 1 | 110.700 | 0.60 | 1.84666 | 23.8 |
| 2 | 18.216 | 2.10 | | |
| 3 | ∞ | 11.60 | 1.90366 | 31.32 |
| 4 | ∞ | 0.20 | | |
| 5 | 44.729 | 1.88 | 1.49700 | 81.6 |
| 6 | −25.550 | 0.20 | | |
| 7 | 17.973 | 1.71 | 1.72916 | 54.7 |
| 8 | 251.466 | d1 (CHANGEABLE) | | |
| 9 | −116.000 | 0.50 | 1.78590 | 44.2 |
| 10 | 8.029 | 1.24 | | |
| 11 | −14.600 | 0.50 | 1.72916 | 54.7 |
| 12 | 8.960 | 1.15 | 1.92286 | 20.9 |
| 13 | 63.080 | d2 (CHANGEABLE) | | |
| 14 | 11.300 | 1.40 | 1.58313 | 59.4 |
| 15 | 64.361 | d3 (CHANGEABLE) | | |

TABLE 6-continued

| 16 | 9.070 | 1.23 | 1.48749 | 70.2 |
|---|---|---|---|---|
| 17 | 12.915 | 2.72 | 1.84666 | 23.8 |
| 18 | 6.168 | 4.00 | 1.58913 | 61.25 |
| 19 | −32.892 | d4 (CHANGEABLE) | | |
| 20 | −98.928 | 2.50 | 1.60700 | 27 |
| 21 | 11.552 | d5 (CHANGEABLE) | | |
| 22 | 15.315 | 2.50 | 1.52500 | 56 |
| 23 | −31.240 | 0.70 | | |
| 24 | ∞ | 0.50 | 1.51633 | 64.1 |
| 25 | ∞ | 0.90 | | |
| 26 | ∞ | 0.50 | 1.51633 | 64.1 |
| 27 | ∞ | | | |

ASPHERIC SURFACE COEFFICIENT

SURFACE NO. 14

K = 0.00000E+00
A4 = −1.01510E−04
A6 = 2.94270E−07
A8 = −6.14420E−08
A10 = 3.51640E−09

SURFACE NO. 19

K = 0.00000E+00
A4 = 3.98450E−04
A6 = 6.55520E−07
A8 = −1.08750E−07
A10 = 1.55720E−08

SURFACE NO. 20

K = 0.00000E+00
A4 = −1.78990E−04
A6 = −2.69010E−05
A8 = 1.90580E−06
A10 = 4.55810E−08

SURFACE NO. 21

K = 0.00000E+00
A4 = −2.74350E−04
A6 = −1.07660E−05
A8 = 4.45480E−07
A10 = 1.38100E−07

SURFACE NO. 22

K = 0.00000E+00
A4 = −1.20550E−03
A6 = 7.87330E−05
A8 = −6.45100E−06
A10 = 2.62890E−07
A12 = −8.69080E−09

SURFACE NO. 23

K = 0.00000E+00
A4 = −1.91680E−03
A6 = 1.48660E−04
A8 = −6.61830E−06
A10 = 6.07550E−09
A12 = 1.52760E−09

| FOCAL LENGTH | d1 | d2 | d3 | d4 | d5 |
|---|---|---|---|---|---|
| 6.49 | 0.700 | 14.320 | 7.320 | 3.718 | 4.922 |
| 14.46 | 6.860 | 8.160 | 4.060 | 6.325 | 5.575 |
| 43.16 | 13.020 | 2.000 | 0.800 | 4.986 | 10.174 |

STOP POSITION: 0.6 mm from front side of surface No. 14
Aspheric lenses of fifth lens group (surface Nos. 20 and 21) and sixth lens group (surface Nos. 22 and 23) are plastic aspheric lenses.

The zoom lens of Illustrative Embodiment 5 is composed of, in an order from the object along the optical axis X, the first lens group G1 having a positive refractive power; the second lens group G2 having a negative refractive power; the aperture stop S; the third lens group G3 having a positive refractive power; the fourth lens group G4 having a positive refractive power; the fifth lens group G5 having a negative refractive power; and the sixth lens group G6 having a positive refractive power. In this structure, a variable power from a wide angle end to a telephoto end can be performed by moving, as shown by the arrow A, the second lens group in the optical axis direction to the image pickup element in a monotonic manner and by moving, as shown by the arrow B, the fourth lens group in the optical axis direction to the object in a monotonic manner and moving, as shown by the arrow C, the fifth lens group in the optical axis direction to the object in a non-linear manner to change the distances among the respective lens groups. The other lens groups are fixed for the variable power. When the two lens group can be both linearly moved as described above, a single actuator can be used to simultaneously move the two lens groups, which is advantageous in that the mechanical structure and control can be simplified.

The first lens group G1 includes, in an order from the object, a negative lens L11, a prism P as a reflective optical element, a positive lens L12, and a positive lens L13. The lenses L11 to L13 are all glass spherical lenses. The second lens group G2 includes, in an order from the object, a negative lens L21, a negative lens L22, and a positive lens L23. The third lens group G3 includes a positive lens L31 at least having an aspheric part at one surface. The fourth lens group G4 is composed of a cemented lens that is obtained by cementing, in an order from the object, a positive c1 lens, a negative c2 lens, and a positive c3 lens and that at least has an aspheric part at the surface closest to the image. The fifth lens group G5 includes a plastic negative lens L51 (also called as 5n lens) that at least has an aspheric part at one surface. The sixth lens group G6 includes a plastic positive lens L61 (also called as 6p lens) that at least has an aspheric part at one surface. The positive lens L61 and an image pickup element CCD have therebetween the low-pass filter LPF and the cover glass CG. By the zoom lenses, the low-pass filter LPF, the cover glass CG, the image pickup element CCD, and an image processing circuit (not shown), the image pickup apparatus is structured.

Illustrative Embodiment 6

Figure 11:
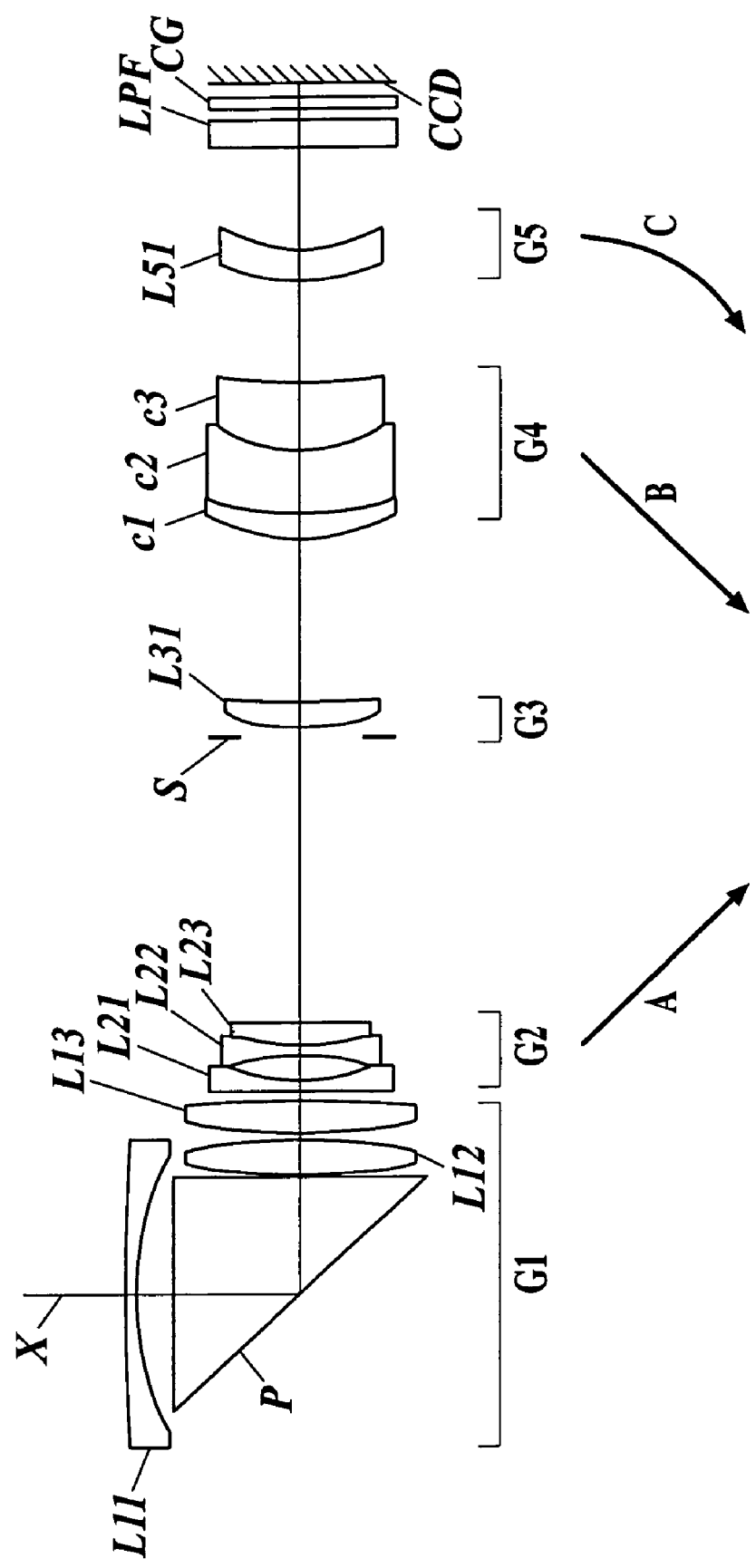
FIG. 11 is a cross-sectional view at a wide angle end of a zoom lens according to Illustrative Embodiment 6.
Figure 12B:
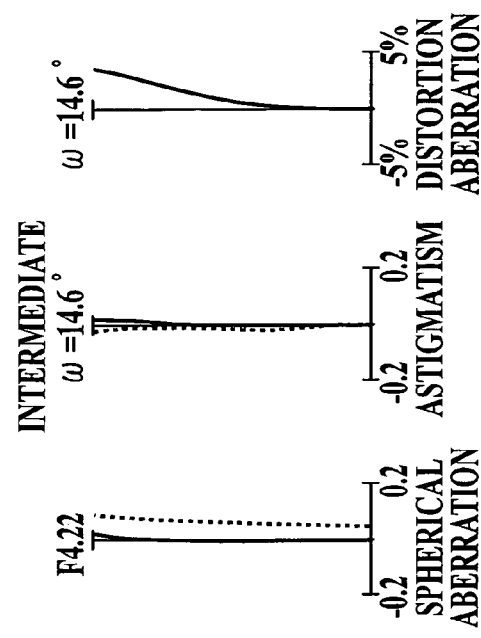
FIGS. 12A to 12C are aberration diagrams illustrating the spherical aberration, astigmatism, and distortion aberration of the zoom lens according to Illustrative Embodiment 6.
Figure 12A:
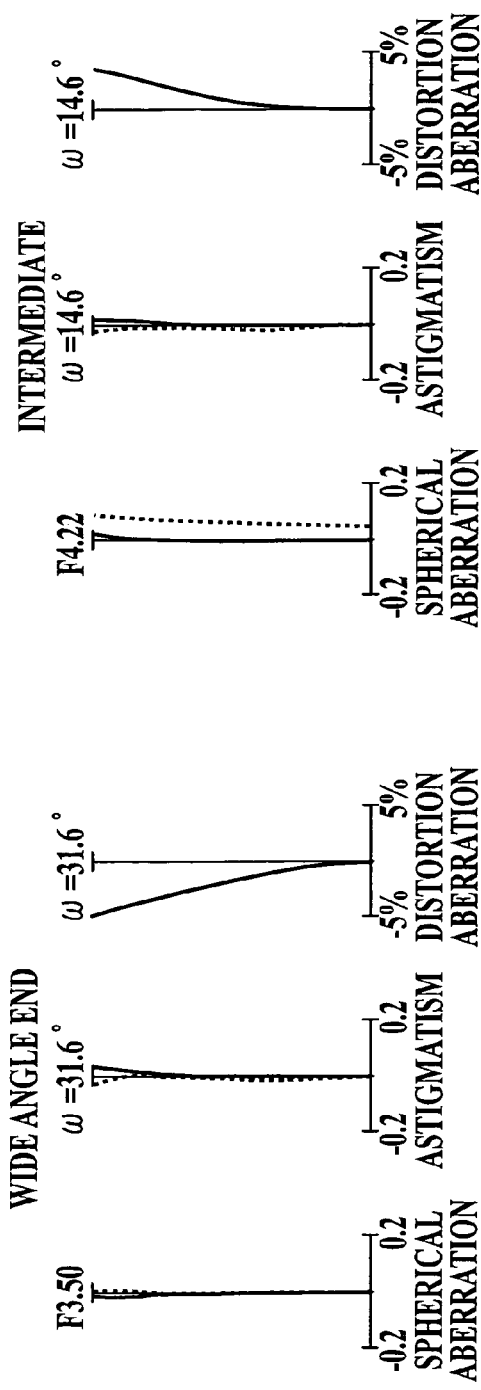
Figure 12C:
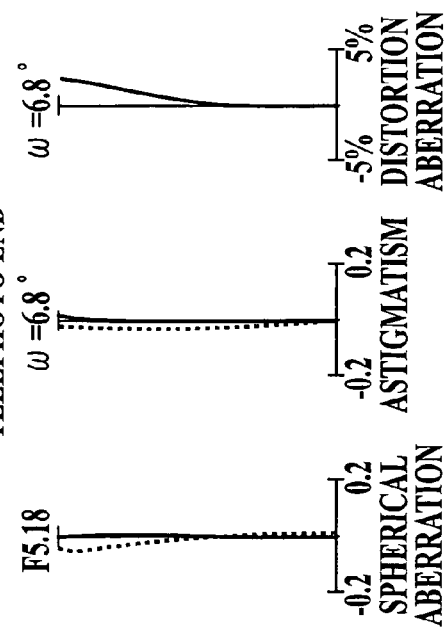

The lens data of the zoom lens of Illustrative Embodiment 6 is shown in Table 7. FIG. 11 is a cross-sectional view at a wide angle end of the zoom lens of Illustrative Embodiment 6. FIGS. 12A to 12C are aberration diagrams illustrating the spherical aberration, astigmatism, and distortion aberration of the zoom lens according to Illustrative Embodiment 6. Here, FIG. 12A is an aberration diagram at a wide angle end. FIG. 12B is an aberration diagram at an intermediate part. FIG. 12C is an aberration diagram at a telephoto end.

TABLE 7

ILLUSTRATIVE EMBODIMENT 6

| SURFACE NO. | R(mm) | d(mm) | $n_d$ | $v_d$ |
|---|---|---|---|---|
| 1 | 99.277 | 0.60 | 1.84666 | 23.8 |
| 2 | 16.919 | 2.11 | | |
| 3 | ∞ | 12.29 | 1.84666 | 23.8 |
| 4 | ∞ | 0.20 | | |
| 5 | 37.906 | 2.09 | 1.49700 | 81.6 |
| 6 | −21.810 | 0.20 | | |
| 7 | 16.823 | 1.51 | 1.66672 | 48.3 |
| 8 | 138.932 | d1 (CHANGEABLE) | | |
| 9 | −57.041 | 0.50 | 1.77250 | 49.6 |
| 10 | 10.172 | 0.96 | | |
| 11 | −25.719 | 0.50 | 1.77250 | 49.6 |

TABLE 7-continued

| 12 | 7.756 | 1.29 | 1.92286 | 20.9 |
|---|---|---|---|---|
| 13 | 26.436 | d2 (CHANGEABLE) | | |
| 14 | 8.664 | 1.12 | 1.58913 | 61.2 |
| 15 | 21.284 | d3 (CHANGEABLE) | | |
| 16 | 6.705 | 1.35 | 1.49700 | 81.6 |
| 17 | 11.939 | 2.65 | 1.84666 | 23.8 |
| 18 | 5.040 | 2.62 | 1.58913 | 61.2 |
| 19 | −214.400 | d4 (CHANGEABLE) | | |
| 20 | 13.291 | 1.20 | 1.52500 | 56 |
| 21 | 8.031 | d5 (CHANGEABLE) | | |
| 22 | ∞ | 1.48 | 1.51633 | 64.1 |
| 23 | ∞ | 0.40 | | |
| 24 | ∞ | 0.50 | 1.51633 | 64.1 |
| 25 | ∞ | | | |

ASPHERIC SURFACE COEFFICIENT

SURFACE NO. 14

K = 0.00000E+00
A4 = −1.90590E−04
A6 = −3.39440E−06
A8 = 6.69470E−07
A10 = −4.05140E−08

SURFACE NO. 19

K = 0.00000E+00
A4 = 8.66870E−04
A6 = 2.73880E−05
A8 = −9.37300E−07
A10 = 8.11300E−08

SURFACE NO. 20

K = 0.00000E+00
A4 = −7.54640E−05
A6 = 1.16410E−05
A8 = −2.32190E−06
A10 = −3.60950E−08

SURFACE NO. 21

K = 0.00000E+00
A4 = −2.68930E−05
A6 = 2.32590E−05
A8 = −2.66700E−06
A10 = −8.79010E−08

| FOCAL LENGTH | d1 | d2 | d3 | d4 | d5 |
|---|---|---|---|---|---|
| 6.41 | 0.600 | 11.258 | 7.255 | 6.224 | 2.500 |
| 13.90 | 5.730 | 6.128 | 4.087 | 5.730 | 6.163 |
| 30.40 | 9.858 | 2.000 | 0.700 | 1.565 | 13.714 |

STOP POSITION: 0.6 mm from front side of surface No. 14
Aspheric lenses of fifth lens group (surface Nos. 20 and 21) are plastic aspheric lenses.

The zoom lens of Illustrative Embodiment 6 is composed of, in an order from the object along the optical axis X, the first lens group G1 having a positive refractive power; the second lens group G2 having a negative refractive power; the aperture stop S; the third lens group G3 having a positive refractive power; the fourth lens group G4 having a positive refractive power; and the fifth lens group G5 having a negative refractive power. In this structure, a variable power from a wide angle end to a telephoto end can be performed by moving, as shown by the arrow A, the second lens group in the optical axis direction to the image pickup element in a monotonic manner and by moving, as shown by the arrow B, the fourth lens group in the optical axis direction to the object in a monotonic manner and moving, as shown by the arrow C, the fifth lens group in the optical axis direction to the object in a non-linear manner to change the distances among the respective lens groups. The other lens groups are fixed for the variable power.

The first lens group G1 includes, in an order from the object, a negative lens L11, a prism P as a reflective optical element, a positive lens L12, and a positive lens L13. The lenses L11 to L13 are all glass spherical lenses. The second lens group G2 includes, in an order from the object, a negative lens L21, a negative lens L22, and a positive lens L23. The third lens group G3 includes a positive lens L31 at least having an aspheric part at one surface. The fourth lens group G4 is composed of a cemented lens that is obtained by cementing, in an order from the object, a positive c1 lens, a negative c2 lens, and a positive c3 lens and that at least has an aspheric part at the surface closest to the image. The fifth lens group G5 includes a plastic negative lens L51 (also called as 5n lens) that at least has an aspheric part at one surface. The negative lens L5 and an image pickup element CCD have therebetween the low-pass filter LPF and the cover glass CG. By the zoom lenses, the low-pass filter LPF, the cover glass CG, the image pickup element CCD, and an image processing circuit (not shown), the image pickup apparatus is structured.

Illustrative Embodiment 7

Figure 13:
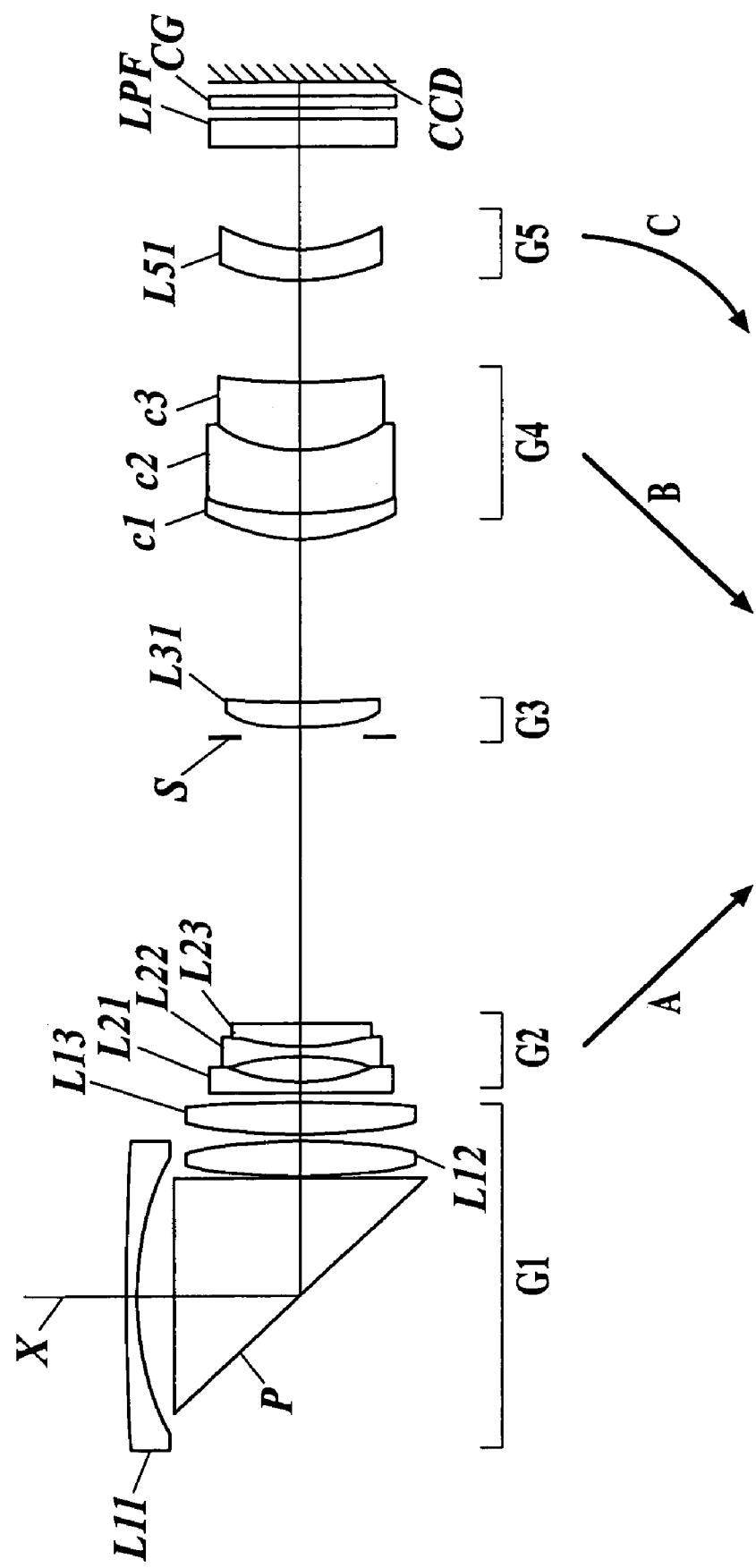
FIG. 13 is a cross-sectional view at a wide angle end of a zoom lens according to Illustrative Embodiment 7.

The lens data of the zoom lens of Illustrative Embodiment 7 is shown in Table 8. FIG. 13 is a cross-sectional view at a wide angle end of the zoom lens of Illustrative Embodiment 6. FIGS. 14A to 14C are aberration diagrams illustrating the spherical aberration, astigmatism, and distortion aberration of the zoom lens according to Illustrative Embodiment 6. Here, FIG. 14A is an aberration diagram at a wide angle end. FIG. 14B is an aberration diagram at an intermediate part. FIG. 14C is an aberration diagram at a telephoto end.

TABLE 8

ILLUSTRATIVE EMBODIMENT 7

| SURFACE NO. | R(mm) | d(mm) | $n_d$ | $v_d$ |
|---|---|---|---|---|
| 1 | 79.843 | 0.60 | 1.84666 | 23.8 |
| 2 | 16.202 | 2.18 | | |
| 3 | ∞ | 12.22 | 1.84666 | 23.8 |
| 4 | ∞ | 0.20 | | |
| 5 | 32.823 | 2.08 | 1.49700 | 81.6 |
| 6 | −23.648 | 0.20 | | |
| 7 | 16.680 | 1.52 | 1.65844 | 50.9 |
| 8 | 158.882 | d1 (CHANGEABLE) | | |
| 9 | −66.087 | 0.50 | 1.80400 | 46.6 |
| 10 | 9.411 | 0.96 | | |
| 11 | −28.014 | 0.50 | 1.77250 | 49.6 |
| 12 | 7.334 | 1.33 | 1.92286 | 20.9 |
| 13 | 27.616 | d2 (CHANGEABLE) | | |
| 14 | 8.850 | 1.09 | 1.58913 | 61.2 |
| 15 | 20.861 | d3 (CHANGEABLE) | | |
| 16 | 6.335 | 1.29 | 1.49700 | 81.6 |
| 17 | 9.860 | 2.43 | 1.84666 | 23.8 |
| 18 | 4.597 | 2.85 | 1.58913 | 61.2 |
| 19 | 71.896 | d4 (CHANGEABLE) | | |
| 20 | 11.242 | 1.23 | 1.60700 | 27 |
| 21 | 8.199 | d5 (CHANGEABLE) | | |
| 22 | ∞ | 1.48 | 1.51633 | 64.1 |
| 23 | ∞ | 0.40 | | |
| 24 | ∞ | 0.50 | 1.51633 | 64.1 |
| 25 | ∞ | | | |

ASPHERIC SURFACE COEFFICIENT

SURFACE NO. 14

K = 0.00000E+00
A4 = −1.73650E−04
A6 = −4.29160E−06

TABLE 8-continued

A8 = 7.84750E−07
A10 = −4.80370E−08
SURFACE NO. 19

K = 0.00000E+00
A4 = 9.96580E−04
A6 = 3.39600E−05
A8 = −6.70270E−07
A10 = 1.30590E−07
SURFACE NO. 20

K = 0.00000E+00
A4 = −3.03200E−04
A6 = −7.35750E−06
A8 = 8.41970E−07
A10 = −6.19890E−08
SURFACE NO. 21

K = 0.00000E+00
A4 = −3.54090E−04
A6 = 7.76220E−07
A8 = 3.97830E−07
A10 = −7.96650E−08

| FOCAL LENGTH | d1 | d2 | d3 | d4 | d5 |
|---|---|---|---|---|---|
| 6.41 | 0.600 | 11.110 | 7.021 | 6.601 | 2.500 |
| 14.00 | 5.771 | 5.940 | 3.873 | 7.359 | 4.891 |
| 30.40 | 9.710 | 2.000 | 0.700 | 1.500 | 13.922 |

STOP POSITION: 0.6 mm from front side of surface No. 14
Aspheric lenses of fifth lens group (surface Nos. 20 and 21) are plastic aspheric lenses.

The zoom lens of Illustrative Embodiment 7 is composed of, in an order from the object along the optical axis X, the first lens group G1 having a positive refractive power; the second lens group G2 having a negative refractive power; the aperture stop S; the third lens group G3 having a positive refractive power; the fourth lens group G4 having a positive refractive power; and the fifth lens group G5 having a negative refractive power. In this structure, a variable power from a wide angle end to a telephoto end can be performed by moving, as shown by the arrow A, the second lens group in the optical axis direction to the image pickup element in a monotonic manner and by moving, as shown by the arrow B, the fourth lens group in the optical axis direction to the object in a monotonic manner and moving, as shown by the arrow C, the fifth lens group in the optical axis direction to the object in a non-linear manner to change the distances among the respective lens groups. The other lens groups are fixed for the variable power.

The first lens group G1 includes, in an order from the object, a negative lens L11, a prism P as a reflective optical element, a positive lens L12, and a positive lens L13. The lenses L11 to L13 are all glass spherical lenses. The second lens group G2 includes, in an order from the object, a negative lens L21, a negative lens L22, and a positive lens L23. The third lens group G3 includes a positive lens L31 at least having an aspheric part at one surface. The fourth lens group G4 is composed of a cemented lens that is obtained by cementing, in an order from the object, a positive c1 lens, a negative c2 lens, and a positive c3 lens and that at least has an aspheric part at the surface closest to the image. The fifth lens group G5 includes a plastic negative lens L51 (also called as 5n lens) that at least has an aspheric part at one surface. The negative lens L51 and an image pickup element CCD have therebetween the low-pass filter LPF and the cover glass CG. By the zoom lenses, the low-pass filter LPF, the cover glass CG, the image pickup element CCD, and an image processing circuit (not shown), the image pickup apparatus is structured.

Table 9 shows values of the respective illustrative embodiments corresponding to the above conditional expressions.

TABLE 9

|  | ILLUSTRATIVE EMBODIMENT 1 | ILLUSTRATIVE EMBODIMENT 2 | ILLUSTRATIVE EMBODIMENT 3 |
|---|---|---|---|
| $n_{c2} - n_{c1}$ | 0.27 | 0.43 | 0.36 |
| $\nu_{c1} - \nu_{c2}$ | 42.70 | 60.72 | 46.40 |
| $n_{c2} - n_{c3}$ | -0.27 | -0.34 | -0.26 |
| $\nu_{c3} - \nu_{c2}$ | 42.70 | 38.52 | 35.60 |
| $\nu_{c1}$ | 70.20 | 81.60 | 70.20 |
| $\nu_{c2}$ | 27.50 | 20.88 | 23.80 |
| $\nu_{c3}$ | 70.20 | 59.40 | 59.40 |
| $n_{pr}$ | 1.90366 | 1.90366 | 1.90366 |
| $\nu_{1p}$ | 81.6 | 81.60 | 81.60 |
| $f_1/(f_w \times f_T)^{1/2}$ | 1.25 | 1.35 | 1.07 |
| $d_{L1PR}/(2Y/f_w)$ | 13.17 | 13.35 | 13.07 |
| $n_{2p}$ | 1.92286 | 1.92286 | 1.92286 |
| $\nu_{2p}$ | 20.88 | 20.88 | 20.88 |
| $f_2/(f_w \times f_T)^{1/2}$ | -0.43 | -0.48 | -0.41 |
| $|f_w/f_{5n}|$ | 0.26 | 0.30 | 0.32 |
| $f_w/f_{6p}$ | 0.27 | 0.33 | 0.28 |
| $m_{56max}/(f_w \times f_T)^{1/2}$ | 0.08 | 0.08 | 0.10 |

|  | ILLUSTRATIVE EMBODIMENT 4 | ILLUSTRATIVE EMBODIMENT 5 |
|---|---|---|
| $n_{c2} - n_{c1}$ | 0.32 | 0.36 |
| $\nu_{c1} - \nu_{c2}$ | 44.80 | 46.40 |
| $n_{c2} - n_{n3}$ | -0.22 | -0.26 |
| $\nu_{c3} - \nu_{c2}$ | 34.00 | 37.45 |
| $\nu_{c1}$ | 70.20 | 70.20 |
| $\nu_{c2}$ | 25.40 | 23.80 |
| $\nu_{c3}$ | 59.40 | 61.25 |
| $n_{pr}$ | 1.84666 | 1.90366 |
| $\nu_{1p}$ | 81.60 | 81.60 |
| $f_1/(f_w \times f_T)^{1/2}$ | 1.17 | 1.12 |
| $d_{L1PR}/(2Y/f_w)$ | 14.80 | 12.89 |
| $n_{2p}$ | 1.92286 | 1.92286 |
| $\nu_{2p}$ | 20.88 | 20.88 |
| $f_2/(f_w \times f_T)^{1/2}$ | -0.44 | -0.39 |
| $|f_w/f_{5n}|$ | 0.37 | 0.38 |
| $f_w/f_{6p}$ | 0.47 | 0.33 |
| $m_{56max}/(f_w \times f_T)^{1/2}$ | 0.08 | 0.09 |

|  | ILLUSTRATIVE EMBODIMENT 6 | ILLUSTRATIVE EMBODIMENT 7 |
|---|---|---|
| $n_{c2} - n_{c1}$ | 0.35 | 0.35 |
| $\nu_{c1} - \nu_{c2}$ | 57.80 | 57.80 |
| $n_{c2} - n_{c3}$ | -0.26 | -0.26 |
| $\nu_{c3} - \nu_{c2}$ | 37.40 | 37.40 |
| $\nu_{c1}$ | 81.60 | 81.60 |
| $\nu_{c2}$ | 23.80 | 23.80 |
| $\nu_{c3}$ | 61.20 | 61.20 |
| $n_{pr}$ | 1.84666 | 1.84666 |
| $\nu_{1p}$ | 81.60 | 81.60 |
| $f_1/(f_w \times f_T)^{1/2}$ | 1.25 | 1.23 |
| $d_{L1PR}/(2Y/f_w)$ | 13.35 | 13.35 |
| $n_{2p}$ | 1.92286 | 1.92286 |
| $\nu_{2p}$ | 20.88 | 20.88 |
| $f_2/(f_w \times f_T)^{1/2}$ | -0.50 | -0.49 |
| $|f_w/f_{5n}|$ | 0.15 | 0.11 |
| $f_w/f_{6p}$ | — | — |
| $m_{56max}/(f_w \times f_T)^{1/2}$ | 0.10 | 0.09 |

Lenses of fifth lens group of Illustrative Embodiments 1 to 7 and sixth lens group of Illustrative Embodiments 1 to 5 are all plastic aspheric lenses.

Image plane shifts due to temperature change in plastic lenses are shown below. These image plane shifts are values taken at d-line at a room temperature +30° C.

|  | WIDE ANGLE END | INTERMEDIATE | TELEPHOTO END |
|---|---|---|---|
| ILLUSTRATIVE EMBODIMENT 1 |  |  |  |
| IMAGE PLANE SHIFT | -0.013 | -0.029 | -0.038 |
| ILLUSTRATIVE EMBODIMENT 2 |  |  |  |
| IMAGE PLANE SHIFT | -0.023 | -0.042 | -0.047 |
| ILLUSTRATIVE EMBODIMENT 3 |  |  |  |
| IMAGE PLANE SHIFT | -0.027 | -0.056 | -0.094 |
| ILLUSTRATIVE EMBODIMENT 4 |  |  |  |
| IMAGE PLANE SHIFT | -0.010 | -0.013 | -0.053 |
| ILLUSTRATIVE EMBODIMENT 5 |  |  |  |
| IMAGE PLANE SHIFT | -0.035 | -0.039 | -0.074 |
| ILLUSTRATIVE EMBODIMENT 6 |  |  |  |
| IMAGE PLANE SHIFT | -0.004 | -0.011 | -0.039 |
| ILLUSTRATIVE EMBODIMENT 7 |  |  |  |
| IMAGE PLANE SHIFT | -0.003 | -0.005 | -0.025 |

USE OF ATHERMAL RESIN (ILLUSTRATIVE EMBODIMENT 1)

| ILLUSTRATIVE EMBODIMENT 1 | WIDE ANGLE END | INTERMEDIATE | TELEPHOTO END |
|---|---|---|---|
| IMAGE PLANE SHIFT WHEN $A = -8 \times 10^{-5}$ | -0.007 | -0.016 | -0.021 |
| IMAGE PLANE SHIFT WHEN $A = -6 \times 10^{-5}$ | -0.005 | -0.012 | -0.016 |

The entire disclosure of Japanese Patent Application No. Tokugan 2005-284994 filed on Sep. 29, 2005 including specification, claims, drawings and summary are incorporated herein by reference in its entirety.

What is claimed is:

1. A zoom lens comprising a first lens group having a positive refractive power, a second lens group having a negative refractive power, a third lens group having a positive refractive power, a fourth lens group having a positive refractive power and a fifth lens group having a negative refractive power, in an order from an object;
   wherein a variable power from a wide angle end to a telephoto end is performed by changing distances among the respective lens groups, and the fourth lens group comprises a three cemented lens composed of a positive c1 lens, a negative c2 lens, and a positive c3 lens from an order from the object.

2. The zoom lens of claim 1, wherein the three cemented lens satisfies following conditional expressions;

$$0.15 < nc2-nc1 \quad (1)$$

$$35 < vc1-vc2 < 70 \quad (2)$$

wherein:
nc1: a refractive index at a d-line of the c1 lens
vc1: an Abbe number of the c1 lens
nc2: a refractive index at a d-line of the c2 lens
vc2: an Abbe number of the c2 lens.

3. The zoom lens of claim 1, wherein the three cemented lens satisfies following conditional expressions;

$$0.10 < nc2-nc3 \quad (5)$$

$$25 < vc3-vc2 < 50 \quad (6)$$

wherein:
nc2: a refractive index at a d-line of the c2 lens
vc2: an Abbe number of the c2 lens
nc3: a refractive index at a d-line of the c3 lens
vc3: an Abbe number of the c3 lens.

4. The zoom lens of claim 1, wherein the c1 lens satisfies a following conditional expression;

$$60 < vc1 < 90 \quad (9)$$

wherein:
vc1: an Abbe number of the c1 lens.

5. The zoom lens of claim 1, wherein the c2 lens satisfies a following conditional expression;

$$18 < vc2 < 35 \quad (11)$$

wherein:
vc2: an Abbe number of the c2 lens.

6. The zoom lens of claim 1, wherein the c3 lens satisfies a following conditional expression;

$$50 < vc3 < 80 \quad (13)$$

wherein:
vc3: an Abbe number of the c3 lens.

7. The zoom lens of claim 1, wherein the first lens group comprises a reflective optical element having a function to reflect light ray to bend a light path.

8. The zoom lens of claim 7, wherein the first lens group comprises a negative lens closer to the object than the reflective optical element and satisfies a following conditional expression;

$$10 < dL1PR/(2Y/fW) < 15 \quad (17)$$

wherein:
dL1PR: a distance from an apex of the negative lens, which is closer to the object to a portion of the reflective optical element, which is closest to an image
fw: a focal length of an entire system at the wide angle end
2Y: a diagonal length of an image pickup element.

9. The zoom lens of claim 1, wherein at least one of positive lenses of the first lens group satisfies a following conditional expression;

$$v1p > 80 \quad (19)$$

wherein:
v1p: an Abbe number of the positive lens of the first lens group.

10. The zoom lens of claim 1, wherein the zoom lens satisfies a following conditional expression;

$$0.5 < f1/(fW \times fT)1/2 < 2.0 \quad (20)$$

wherein:
f1: a focal length of the first lens group
fW: a focal length of an entire system at the wide angle end
fT: a focal length of the entire system at the telephoto end.

11. The zoom lens of claim 1, wherein the zoom lens satisfies a following conditional expression;

$$-1.0 < f2/(fW \times fT)1/2 < -0.2 \quad (26)$$

wherein:
f2: a focal length of the second lens group
fW: a focal length of an entire system at the wide angle end
fT: a focal length of the entire system at the telephoto end.

12. The zoom lens of claim 1, wherein the third lens group is fixed for a variable power.

13. The zoom lens of claim 1, wherein the fifth lens group comprises a plastic lens and satisfies a following conditional expression;

$$|fW/f5P1| < 0.8 \quad (28)$$

wherein:
fw: a focal length of an entire system at the wide angle end
f5P1: a focal length of the plastic lens of the fifth lens group.

14. The zoom lens of claim 1, further comprising a sixth lens group having a positive refractive power.

15. The zoom lens of claim 14, wherein the sixth lens group is fixed for a variable power.

16. The zoom lens of claim 14, wherein the sixth lens group comprises a plastic lens and satisfies a following conditional expression;

$$fW/f6P1 < 0.8 \quad (30)$$

wherein:
fw: a focal length of an entire system at the wide angle end
f6P1: a focal length of the plastic lens of the sixth lens group.

17. The zoom lens of claim 1, wherein the zoom lens satisfies a following conditional expression;

$$0.03 < m5\text{imax}/(fW \times fT)1/2 < 0.2 \quad (32)$$

wherein:
m5i max: a maximum value of a lateral magnification of a constructional system composed of one or more groups at a rear side of the fifth lens group
fW: a focal length of an entire system at the wide angle end
fT: a focal length of the entire system at the telephoto end.

18. The zoom lens of claim 1, wherein when a variable power is performed, at least three lens groups of the zoom lens are moved.

19. The zoom lens of claim 1, wherein the zoom lens performs a focusing from infinity to finite distance by moving at least the fifth lens group.

20. An image pickup apparatus, comprising the zoom lens of claim 1 and an image pickup element.

* * * * *

UNITED STATES PATENT AND TRADEMARK OFFICE
CERTIFICATE OF CORRECTION

PATENT NO. : 7,365,911 B2  
APPLICATION NO. : 11/528003  
DATED : April 29, 2008  
INVENTOR(S) : Atsushi Yamashita Page 1 of 1

It is certified that error appears in the above-identified patent and that said Letters Patent is hereby corrected as shown below:

Title page,

Item (30) Foreign Application Priority Data should read as follows:

--Sept. 29, 2005 (JP) 2005-284994--

Signed and Sealed this

Thirteenth Day of October, 2009

David J. Kappos  
*Director of the United States Patent and Trademark Office*